(12) United States Patent
Campbell et al.

(10) Patent No.: US 12,062,204 B2
(45) Date of Patent: Aug. 13, 2024

(54) METHODS AND SYSTEMS FOR SLIDE IMAGING CALIBRATION

(71) Applicant: ZOMEDICA INC., Ann Arbor, MI (US)

(72) Inventors: William Eugene Campbell, Marietta, GA (US); Negin Ghassemian, Smyrna, GA (US)

(73) Assignee: Zomedica Inc., Ann Arbor, MI (US)

( * ) Notice: Subject to any disclaimer, the term of this patent is extended or adjusted under 35 U.S.C. 154(b) by 129 days.

(21) Appl. No.: 18/082,959

(22) Filed: Dec. 16, 2022

(65) Prior Publication Data

US 2024/0202957 A1 Jun. 20, 2024

(51) Int. Cl.
G06T 7/70 (2017.01)
G02B 21/26 (2006.01)
G02B 21/36 (2006.01)

(52) U.S. Cl.
CPC ............... *G06T 7/70* (2017.01); *G02B 21/26* (2013.01); *G02B 21/365* (2013.01); *G06T 2207/10056* (2013.01)

(58) Field of Classification Search
CPC . G06T 7/70; G06T 2207/10056; G02B 21/26; G02B 21/365

USPC .......................................................... 348/79
See application file for complete search history.

(56) References Cited

U.S. PATENT DOCUMENTS

| 2012/0127297 A1* | 5/2012 | Baxi | ................. | G06V 20/695 |
| | | | | 382/173 |
| 2020/0080940 A1* | 3/2020 | Garsha | ................. | G02B 21/365 |

* cited by examiner

*Primary Examiner* — Allen C Wong
(74) *Attorney, Agent, or Firm* — Standley Law Group LLP; Jeffrey S. Standley; Bryan P. Finneran

(57) ABSTRACT

Various examples of systems and methods are provided for imaging calibration for slide processing. In one example, among others, a system for processing microscope slides includes a light source; an imaging device comprising a lens; and a slide positioner that can position the ground-glass portion of a slide between the light source and lens. Processing circuitry of the system can acquire an image of at least a section of the ground-glass portion at an initial position; analyze contrast of adjacent pixels with respect to a defined contrast characteristic; iteratively advance the lens and acquire additional images based upon analysis of contrast of adjacent pixels with respect to the defined contrast characteristic; and identify an optimal focal location of the lens based upon the defined contrast characteristic. Subsequent image acquisition via the lens can be based at least in part upon the optimal focal location.

20 Claims, 25 Drawing Sheets

METHODS AND SYSTEMS FOR SLIDE IMAGING CALIBRATION

BACKGROUND

Microscope slides are prepared by hand for examination under a microscope. After a sample has been transferred to the slide and dried, the sample can be stained using a pipet or a bath to aid in examination. Such processing can be labor intensive. After drying, the slide is positioned under a microscope for examination and evaluation. In some cases, the processed slide is physically shipped to another facility for examination and evaluation.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
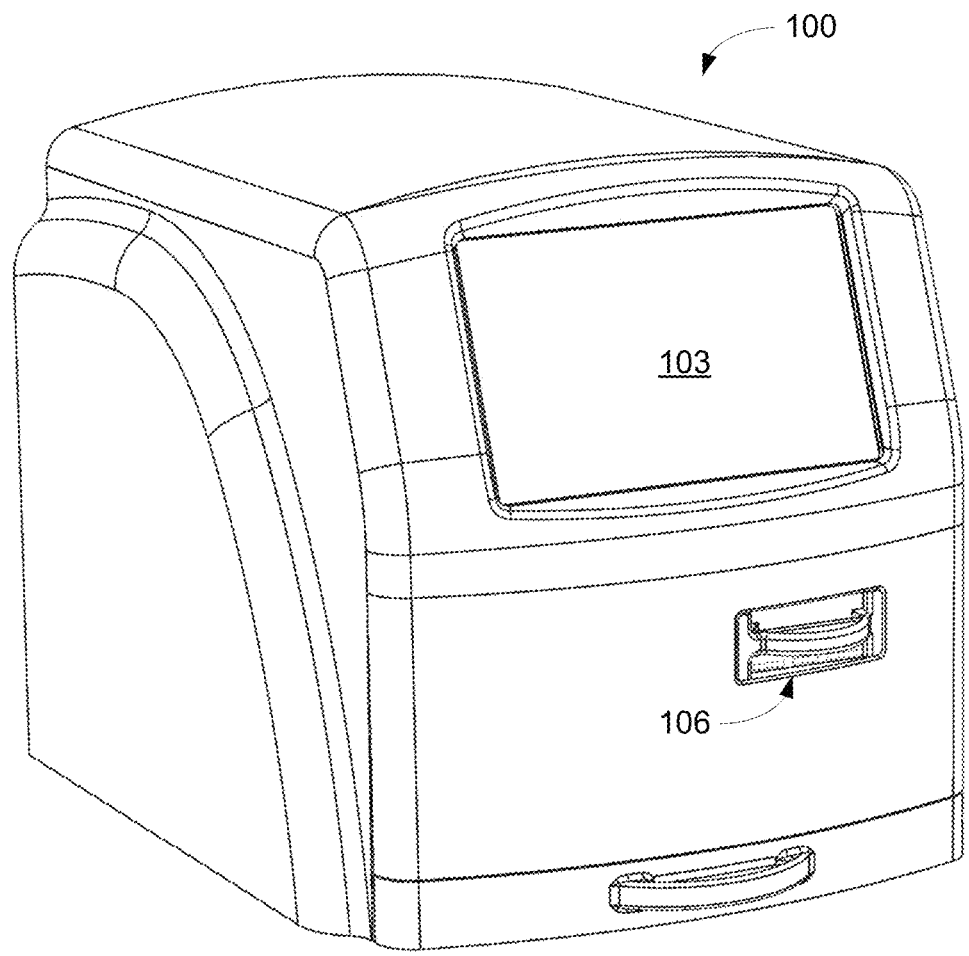
FIG. 1 is a drawing of an example of a slide processing unit in accordance with various embodiments of the present disclosure.

Disclosed herein are various examples of methods and systems related to imaging calibration for microscope slide processing. Reference will now be made in detail to the description of the embodiments as illustrated in the drawings, wherein like reference numbers indicate like parts throughout the several views.

Slide processing units can be used for automated processing and imaging samples on a slide. Samples can include fluids (e.g., blood or other bodily fluids), tissue or other types of samples. Once transferred to a slide, the sample can be processed and imaged for examination by a user. Images of the sample can be captured with a camera or other imaging device and displayed and/or stored for examination by the user. The images of the slide can be locally and/or remotely accessed by the user in real time, or can be accessed by the user after capture and storage. For example, images of the processed sample can be stored in memory and subsequently accessed by the user when his or her schedule allows. A problem with automated microscopes is the inability to sense when a lens objective is touching the glass surface of the slide. If the objective does touch the glass surface it can not only destroy the sample but also has the potential to break a slide or scratch the face of the objective. If the lens objective touches the sample on the glass slide, then cross contamination between slides and/or degradation of image quality from a dirty objective face is possible.

Referring to FIG. 1, shown is a perspective view of an example of a slide processing unit (or slide processor) 100, in accordance with various embodiments of the present disclosure. The slide processing unit 100 includes a display screen 103 for displaying and/or accessing information about the slide processing unit 100. For example, the processing status of a slide (e.g., staining, drying, imaging, etc.) can be indicated on the display screen 103. After the slide has been processed, an image of the sample can be provided through the display screen 103. In some implementations, the image of the sample can be manipulated through the display screen 103. The display screen 103 can be touch-sensitive to allow for user input through the display screen 103. In other embodiments, a user interface unit (e.g., keyboard, mouse, touch pad, etc.) can be communicatively coupled to the slide processing unit 100 through a communications interface. The connection can be through a wireless link (e.g., WiFi, Bluetooth®, Kleer, Infrared, etc.) or through a wired connection.

Processing of the slide can be carried out in an enclosed environment to reduce the chance of contamination. A carriage 106 allows a user to insert a slide into the slide processing unit 100 for processing. With the carriage 106 pulled out of the slide processing unit 100, a slide including a sample can be inserted into the carriage 106. A guide or slot in the bottom of the carriage 106 can be used to hold the slide in the proper orientation for acquisition by a slide positioner that repositions the slide for processing and imaging within the slide processing unit 100.

Figure 2:
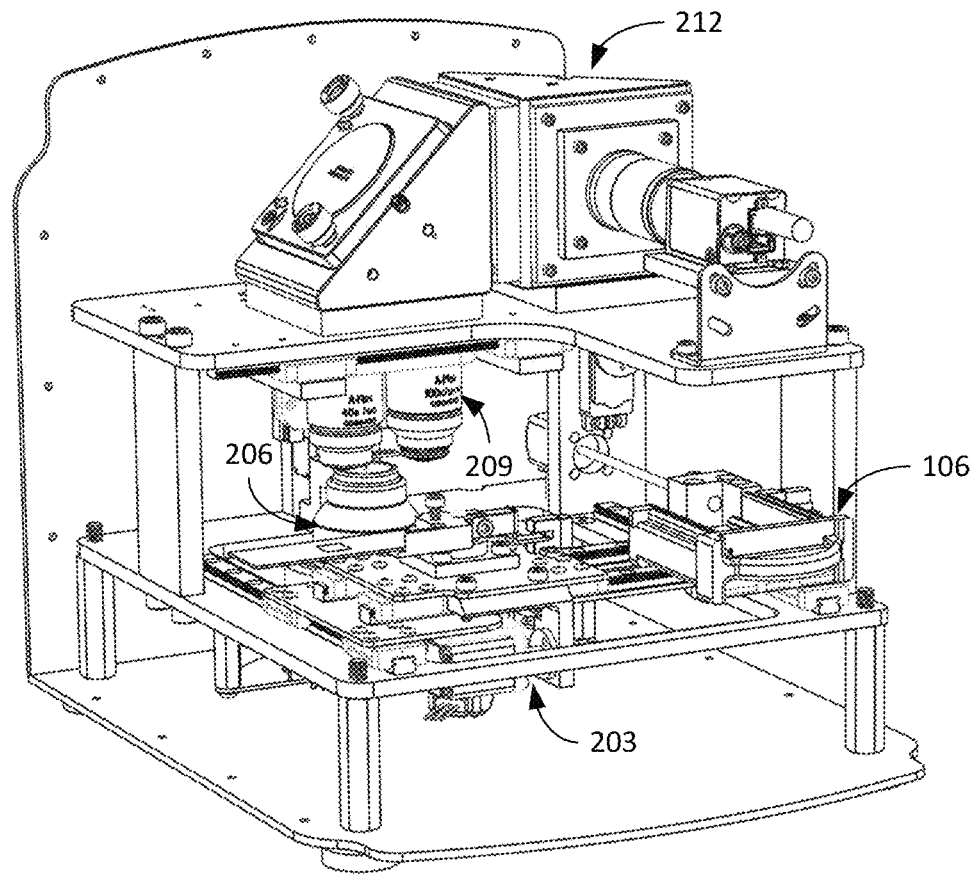
FIG. 2 is a perspective view of an example of the interior of the slide processing unit of FIG. 1 in accordance with various embodiments of the present disclosure.
Figure 3A:
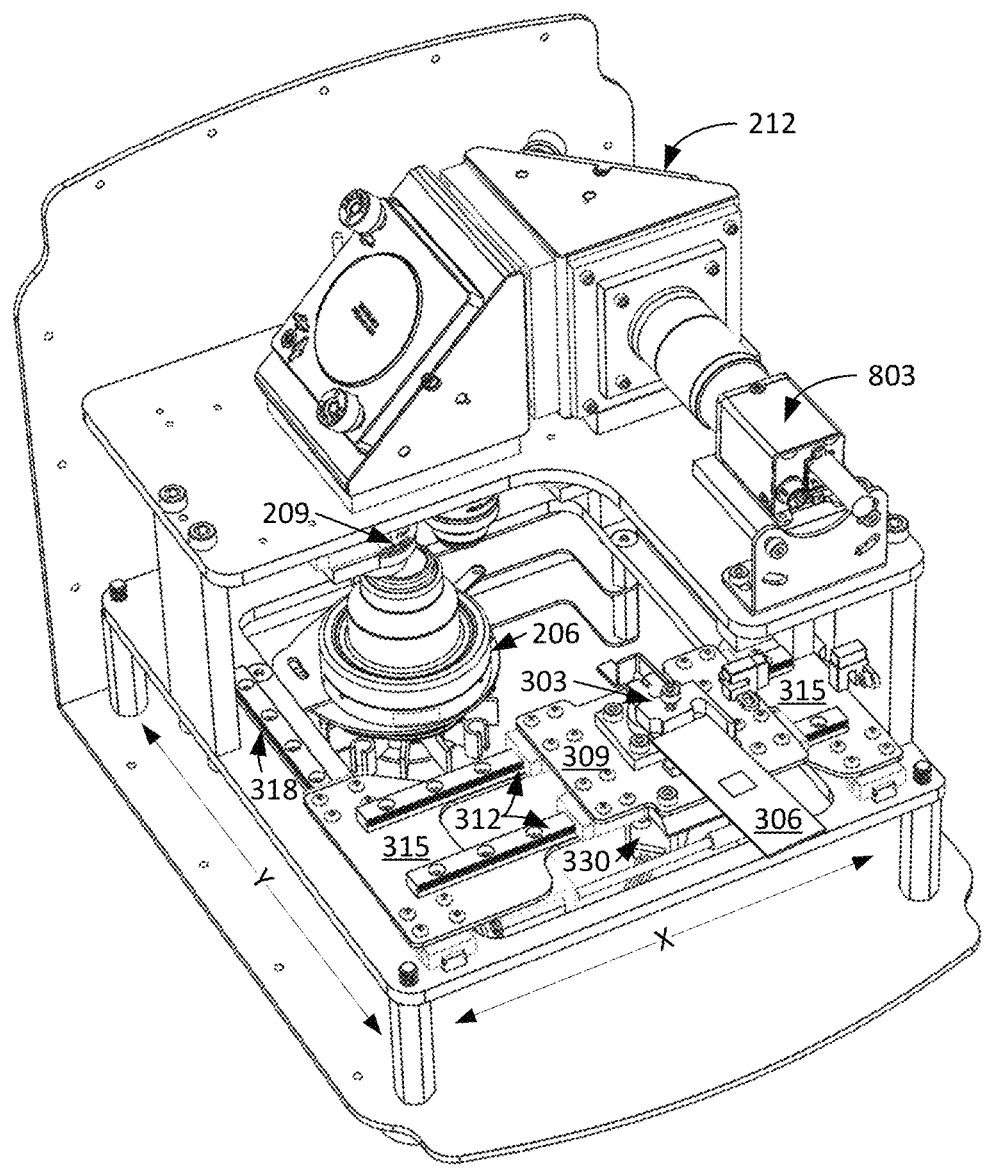
FIGS. 3A-3D are perspective views of the interior of the slide processing unit of FIG. 2 illustrating positioning of a slide in accordance with various embodiments of the present disclosure.

Referring next to FIGS. 2 and 3A-3D, show various perspective views of an example of a portion of the interior of the slide processing unit 100 with the cover including the display screen 103 removed. As shown in FIG. 2, the slide processing unit 100 includes a slide positioner 203, a light source 206, one or more microscopic lenses 209 and an image capture unit 212. The structure and operation of the slide positioner 203 is further illustrated in FIGS. 3A-3D. As seen in FIG. 3A, the slide positioner 203 includes a slide clamp 303 that grips the slide 306 when inserted through the carriage 106. The slide clamp 303 is supported by a mounting plate 309 that can be positioned along the x-axis and y-axis using guide rails and stepper or servo motors with finely pitched jack screws (with a high number of threads per inch). A first pair of guide rails 312 support the mounting plate 309 and allow for its movement along the x-axis. The guide rails 312 are secured in position by end plates 315 that are supported by a second pair of guide rails 318. The second pair of guide rails 318 allows movement of the first pair of guide rails 312, and thus the mounting plate 309 and slide clamp 303, along the y-axis.

Figure 3B:
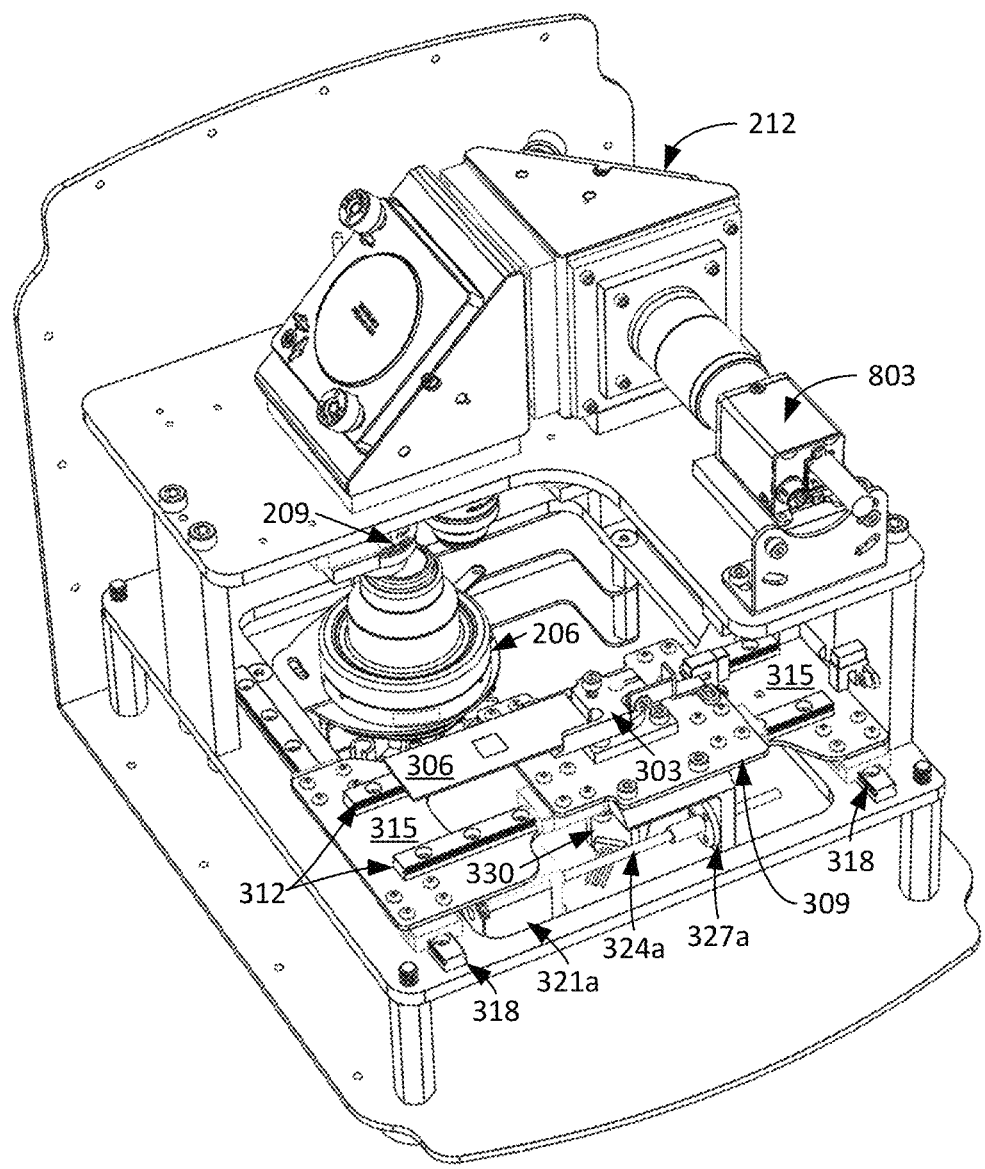
Figure 3C:
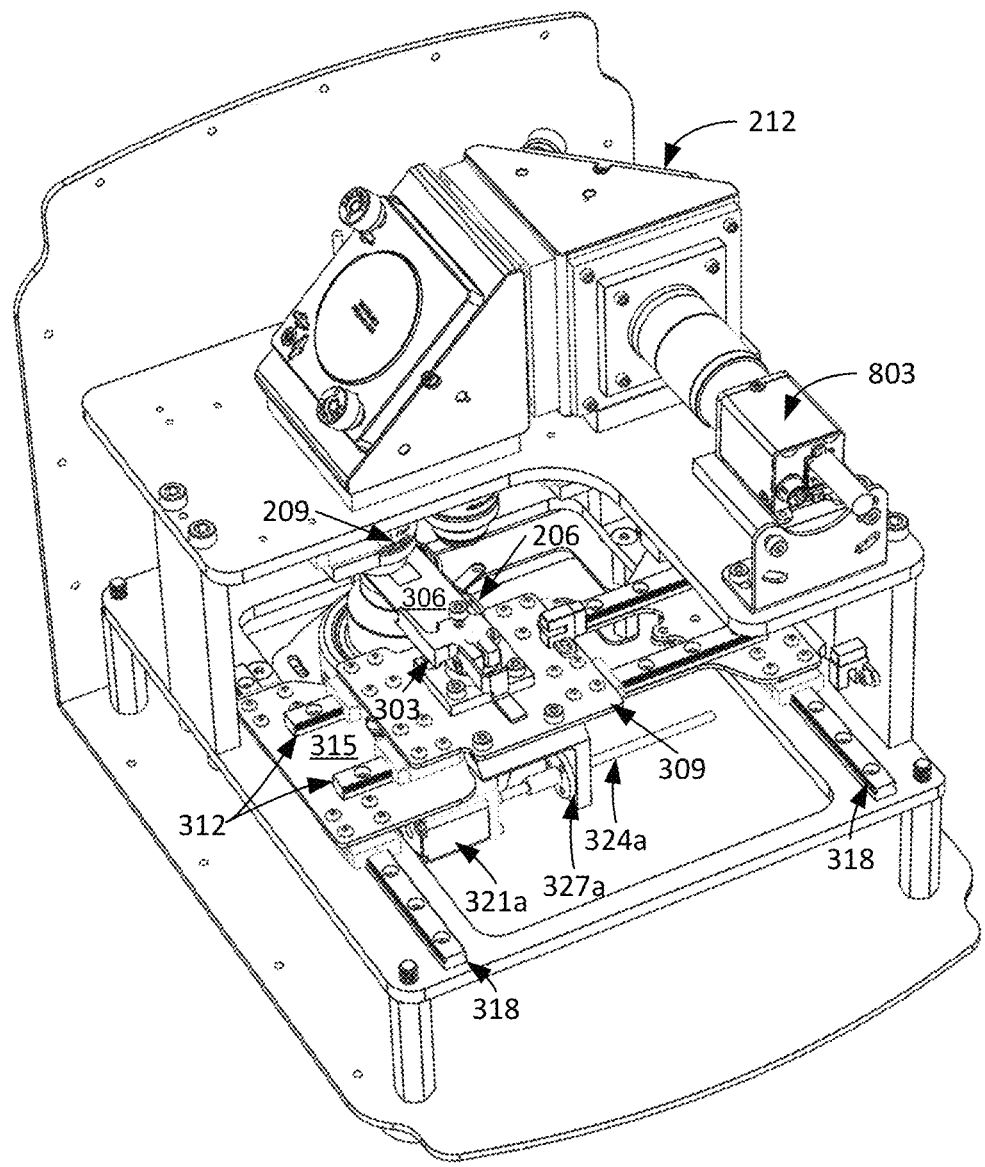

As can be seen in FIGS. 3B and 3C, a stepper or servo motor 321*a* can be mounted to one of the end plates 315 to control movement along the first pair of guide rails 312. The treads of the jack screw 324*a* can engage with a threaded portion of a bracket 327*a* (e.g., a threaded sleeve mounted to the bracket or a threaded opening through the bracket) secured to the mounting plate 309 such that rotation of the jack screw 324*a* moves the mounting plate 309 along the first pair of guide rails 312. Another stepper or servo motor 321*b* can be mounted (e.g., to a support structure) to control movement of the assembly including the slide clamp 303, mounting plate 309, first pair of guide rails 312 and end plates 315 along the second pair of guide rails 318 as illustrated in the cutaway view of FIG. 3D. The treads of the jack screw 324*b* can engage with a threaded portion of a bracket 327*b* (e.g., a threaded sleeve mounted to the bracket or a threaded opening through the bracket) secured to one of the end plates 315. Rotation of the jack screw 324*b* moves the assembly along the first pair of guide rails 312.

Figure 3D:
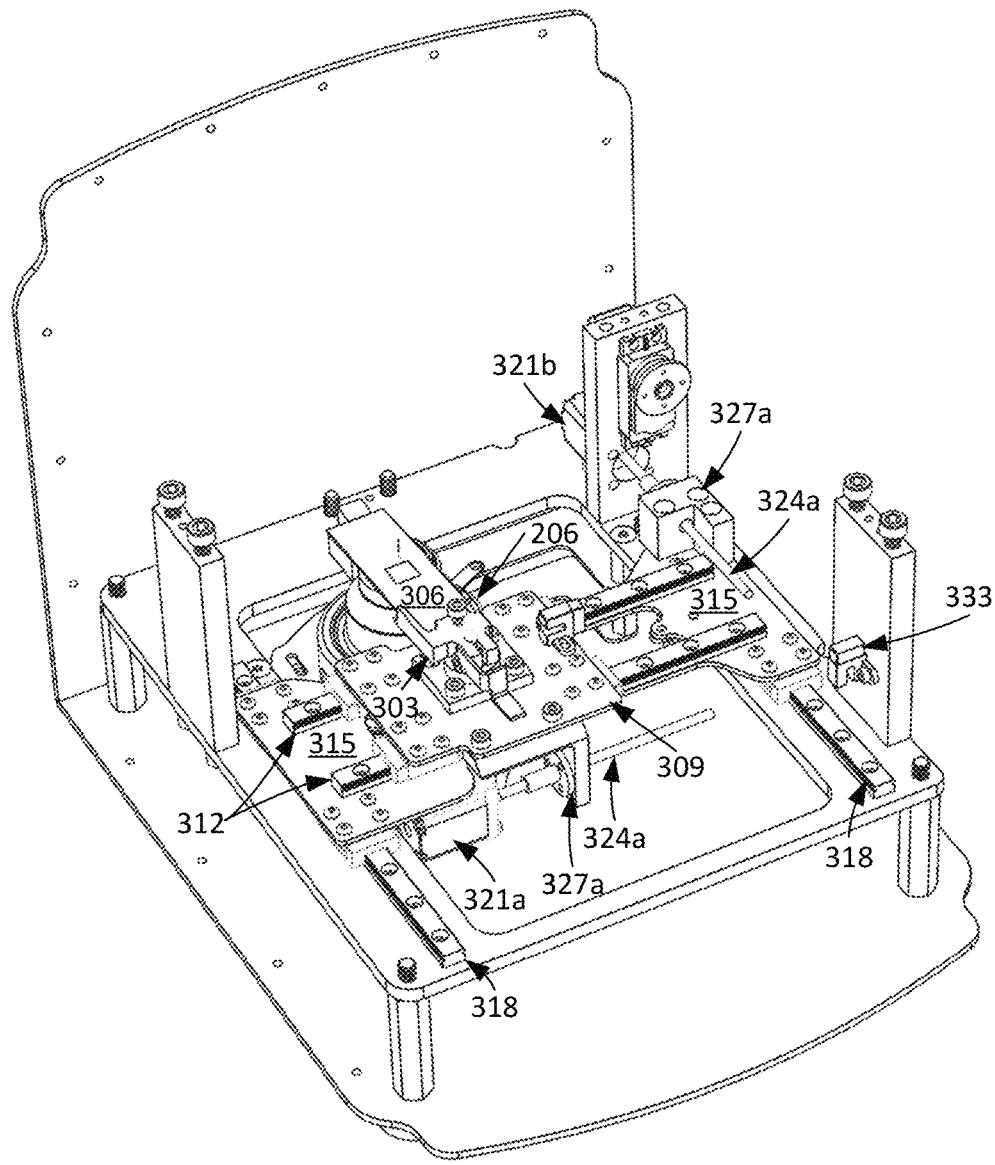

A low wear, low friction material such as a layer of polymer (e.g., polytetrafluoroethylene (PTFE), fluorinated ethylene propylene, etc.) or other appropriate material can be used to provide for smooth movement of the mounting plate 309 across the first pair of guide rails 312 and/or the end plates 315 across the second pair of guide rails 318. The position of the slide positioner 203 can be detected using one or more sensors. For example, a sensor 333 (e.g., a capacitive sensor, a magnetic sensor, an infrared sensor, a photosensitive sensor, etc.) can be used to detect the position of an end plate 315 when it reaches a travel limit along the second pair of guide rails 318 as illustrated in FIG. 3D. Similar sensors can be used to detect the position of the mounting plate 309 as it reaches a travel limit along the first pair of guide rails 312. These sensors can also be used as reference points for calibration and/or control of the slide positioner 203.

Figure 4A:
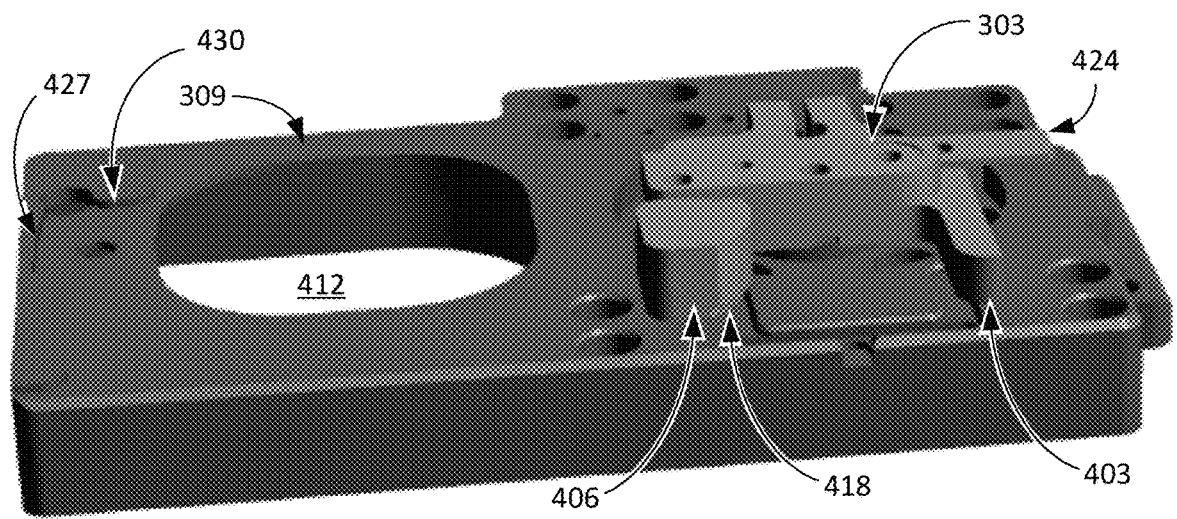
FIGS. 4A-4F are perspective views of an example of a mounting plate and slide clamp that can be used in the slide processing unit of FIGS. 1 and 2 in accordance with various embodiments of the present disclosure.
Figure 4B:
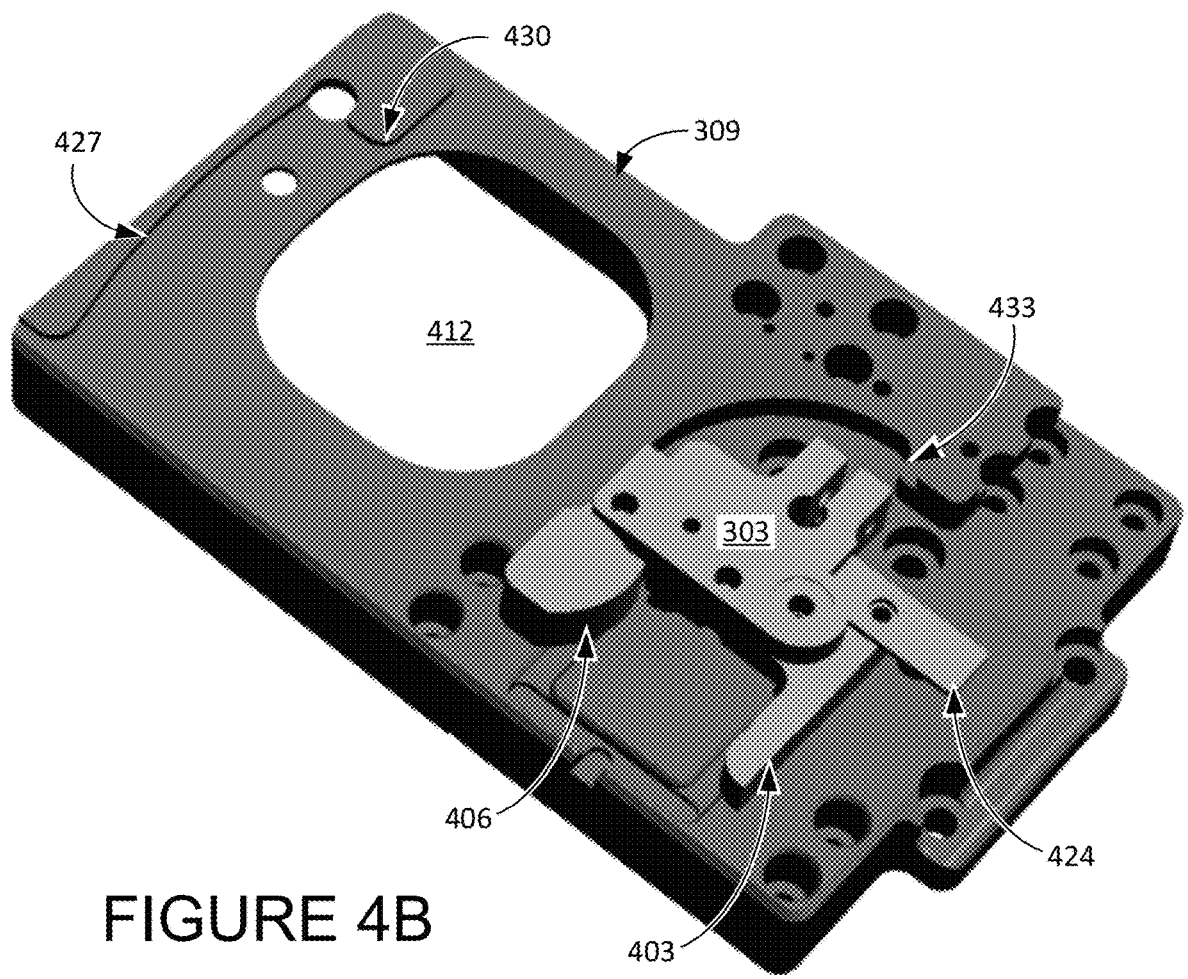
Figure 4C:
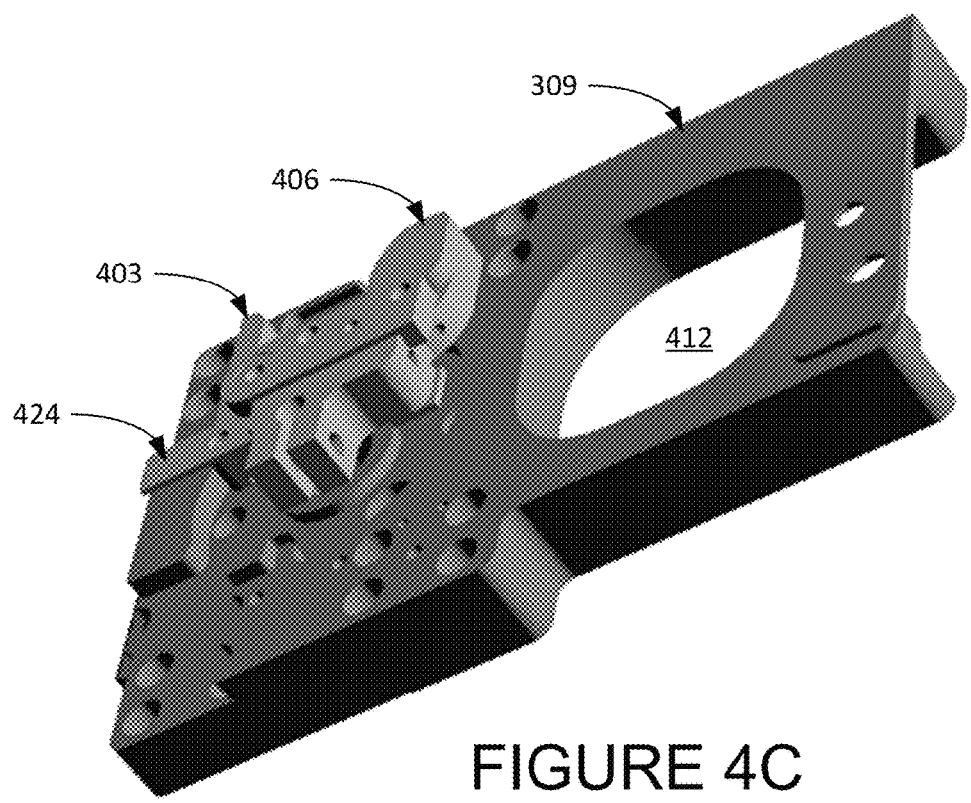
Figure 4D:
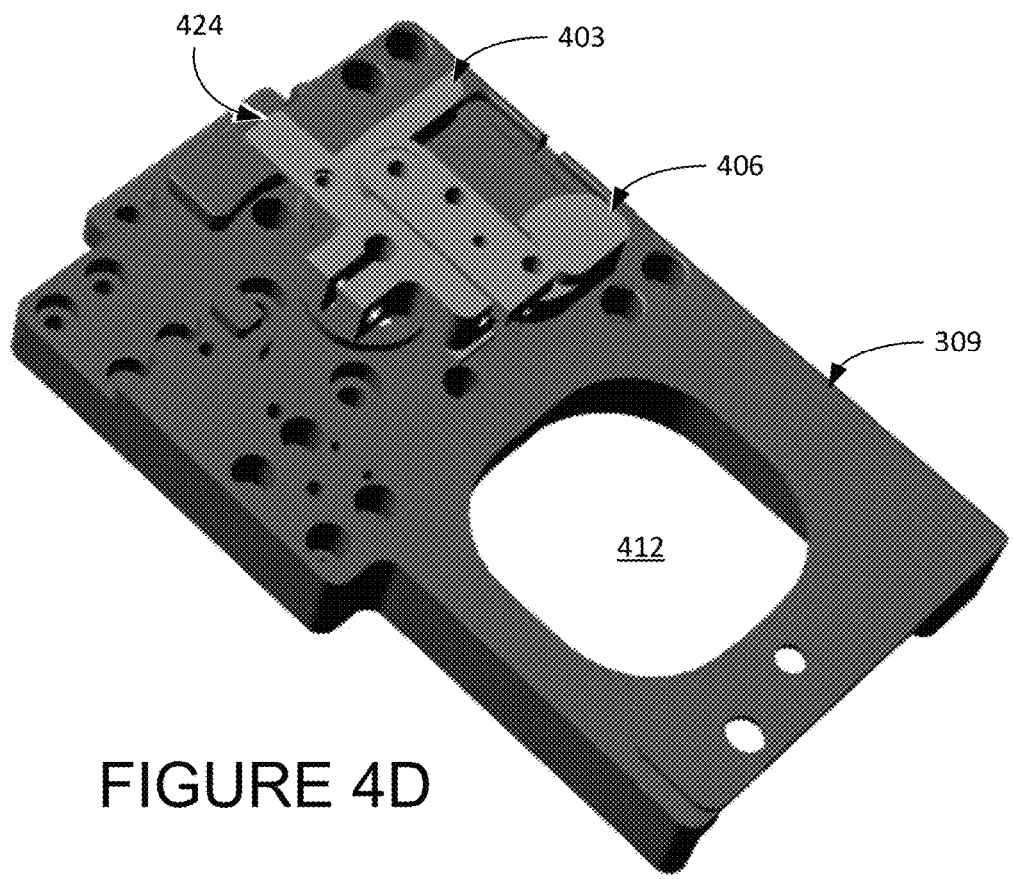
Figure 4E:
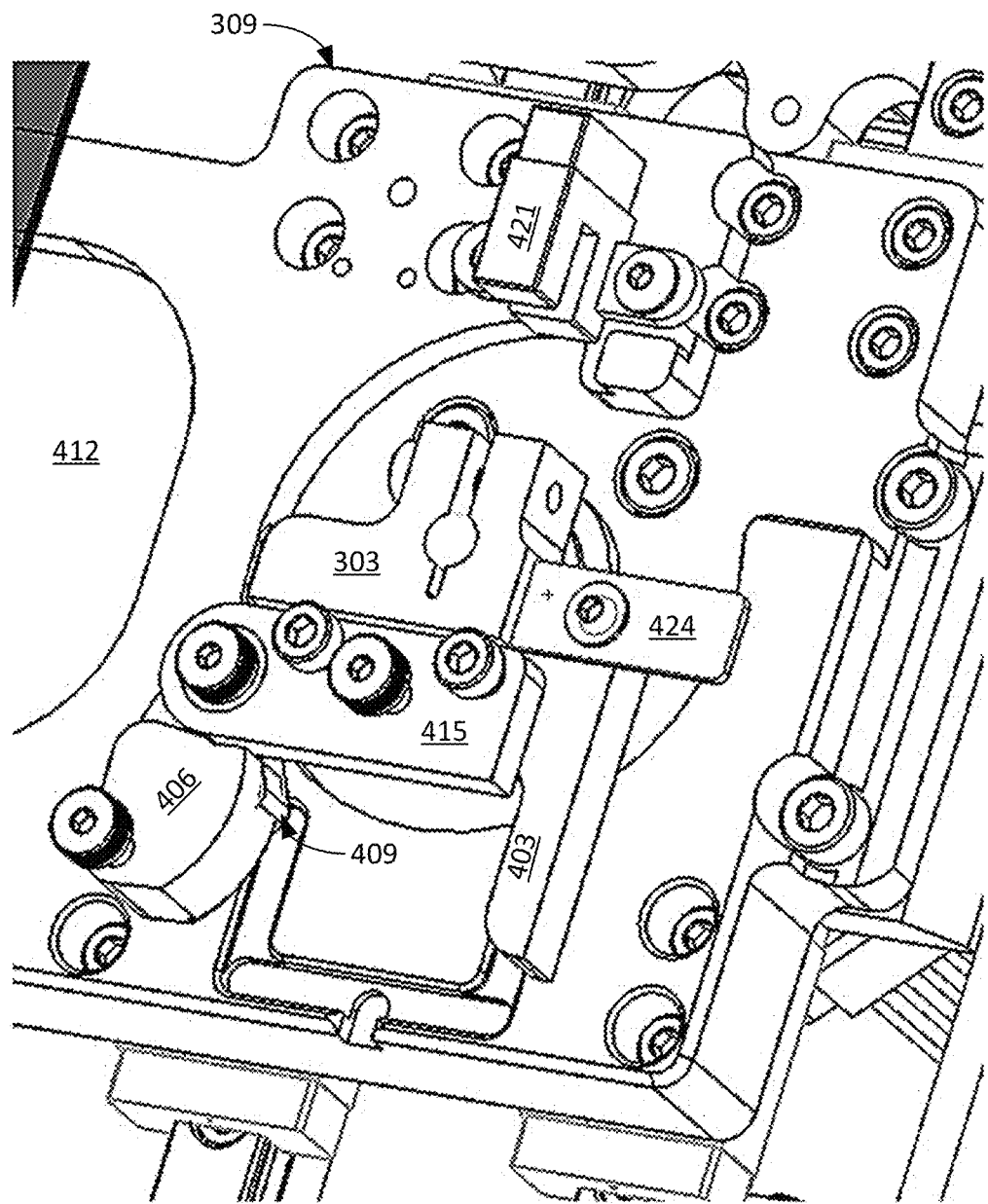
Figure 4F:
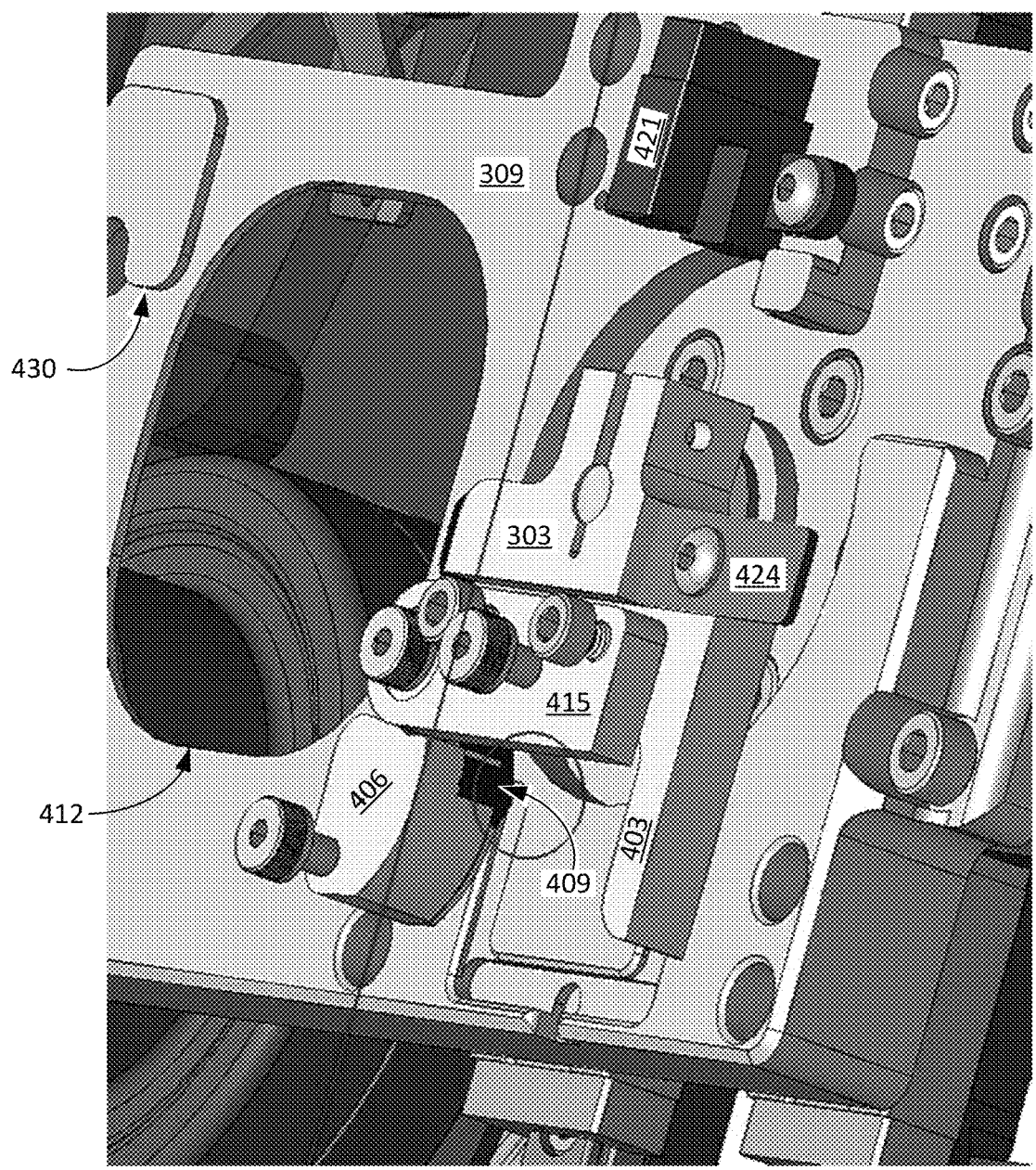

Referring to FIGS. 4A-4G, shown are various perspective views of an example of a rotator assembly including the slide clamp 303 and mounting plate 309. A stepper or servo motor 330 can be mounted to a lower side of the mounting plate 309 as illustrated in FIGS. 3A and 3B. The shaft of the stepper or servo motor 330 can extend through the mounting plate 309. With the slide clamp 303 secured to the shaft of the motor 330, the motor 330 can be used to control rotation of the slide clamp 303 about the z-axis defined by the motor shaft. The slide clamp 303 includes an alignment arm 403 on a first side and a clamping arm 406 on a second side. The sample slide 306 can be inserted between the two arms 403 and 406. The alignment arm 403 is fixed in position to align one side of the slide, while the clamping arm 406 applies pressure to the opposite side the sample slide 306 to hold it in position against the alignment arm 403 during processing by the slide processing unit 100. A spring can be used to apply a clamping force with the clamping arm 406. As illustrated in FIGS. 4E and 4F, the clamping arm 406 can include a textured edge 409 that can help grip the slide 306. In some implementations, the textured edge 409 can be provided by a flexible material (e.g., rubber) that aids in gripping the slide 306.

The mounting plate 309 acts as a stage for microscopic examination of the sample slide 306. As shown in FIGS. 4A-4F, the mounting plate 309 includes an opening 412 that allows the light source 206 to illuminate the sample during image capture, when the slide 306 is positioned over the opening 412. The slide clamp 303 can utilize a spring assembly (e.g., a hold down spring) to apply downward pressure on the slide 306 to hold it against the mounting plate, which acts as a stage during microscopic imaging of the sample. A pressure plate 415 (FIGS. 4E and 4F) that extends over the alignment arm 403 and clamping arm 406 can be used to secure the hold down spring (or other spring assembly) in position on the slide clamp 303. A lower edge 418 (FIG. 4A) of the clamping arm 406 and/or the alignment arm 403 can be beveled outward to aid in holding the slide 306 against the surface of the mounting plate 309.

As previously discussed, the stepper or servo motor 330 (FIGS. 3A-3B) can be used to control rotation of the slide clamp 303. The position of the slide clamp 303 can be detected using one or more sensors. In the example of FIGS. 4E and 4F, a sensor 421 is used to detect when the slide clamp 303 has been rotated to a reference position where the slide clamp 303 is aligned to receive a sample side 306 from or return the sample slide 306 to the carriage 106 (FIG. 1). A tab 424 affixed to the slide clamp 303 can be used to detect the position of the slide clamp 303 with the sensor 421 (e.g., a capacitive sensor, a magnetic sensor, an infrared sensor, a photosensitive sensor, etc.). For example, the tab 424 extends from a side of the slide clamp 303 such that it can be detected by the sensor 421 when the slide clamp 303 is oriented with the carriage 106, where can receive a sample slide 306. With the reference position known, the stepper or servo motor 330 can be controlled to position the sample slide 306 in the proper orientation for processing and for imaging.

For imaging, the sample slide 306 can be positioned over the opening 412 of the mounting plate 309. To ensure that the alignment of the sample slide 306 over the opening 412 is repeatable, the mounting plate 309 can include a guide shoulder 427 opposite from the slide clamp 303 as illustrated in FIGS. 4A and 4B. The guide shoulder 427 can be machined or otherwise formed on the mounting plate 309 so that, as a sample slide 306 is rotated over the opening 412, the distal end of the slide 306 opposite the slide clamp 303 contacts the guide shoulder 427 to align the position along the longitudinal axis of the slide 306. The downward pressure applied by the spring assembly of the slide clamp 303 can hold the slide 306 against the mounting plate 309 and prevent the distal end of the slide 306 from moving over the guide shoulder 427. A slide stop 430 can be used to prevent the distal end of the slide 306 from moving beyond the desired orientation. The slide stop 430 can be machined or otherwise formed on the mounting plate 309 adjacent to the guide shoulder 427. The combination of the alignment arm 303, guide shoulder 427 and slide stop 430 allows for consistent positioning of sample slides 306 on the mounting plate 309 during imaging with the microscopic lenses 209 and image capture unit 212 (FIG. 3C). In addition, a sample slide 306 can be reinserted and positioned for reexamined at the same location at different times. The mounting plate 309 can include a backside groove (shoulder or boss) with a clamp stop 433 to provide a hard stop to ensure a 90 degree alignment and prevent over-rotation during positioning of the slide 306 under the digital microscope. Consistency of positioning allows the slide processing unit 100 to relocate image positions on the sample slide 306 after it has been removed and replaced.

Referring back to FIGS. 3A-3D, the movement of a slide 306 by the slide positioner 203 is illustrated. As shown in FIG. 3A, the slide positioner 203 includes a slide clamp 303 that grips a sample slide 306 when inserted through the carriage 106. With the carriage 106 closed, a proximal end of the sample slide 306 extends into the slide processing unit 100. With the slide clamp 303 rotated to the reference position as detected by sensor 421 (FIGS. 4E-4F), the stepper or servo motors 321 can be controlled to align the slide clamp 303 with, but offset from, the proximal end of the sample side 306. In some embodiments, this can be a default position when no slide 306 is being handled by the slide processing unit 100. The slide positioner 203 can then be advanced along the y-axis by stepper or servo motor 321b to secure the proximal end of the sample slide 306 between the alignment arm 403 and clamping arm 406 of the slide clamp 303. Pressure from the clamping arm 406 forces the opposite side of the slide 306 against the alignment arm 403, which properly orients the slide 306 in the slide clamp 303.

The slide clamp 303 can also include a spring assembly for holding the slide 306 in position on the mounting plate. For example, a hold down spring can be configured to apply downward pressure on the top of the slide 306 to avoid twisting of the slide 306 in the slide clamp 303. In other embodiments, the inner surface of the alignment and clamping arms 403 and 406 can be tapered or beveled outward from top to bottom such that a force is applied to the top edges of the sides of the slide 306 to avoid twisting in the slide clamp 303. With the slide clamp 303 holding the proximal end of the sample slide 306, the slide positioner 203 can then be retracted along the y-axis by stepper or servo motor 321b to remove the slide 306 from the carriage 106. With the sample slide 306 clear of the carriage 106, the slide positioner 203 can reposition the slide 306 along the x-axis and y-axis by moving along the rails 312 and 318, as well as by rotating the slide 306 about the z-axis.

For example, a small drop of blood can be placed on an enumerated location on an unprepared glass microscope slide 306. The sample slide 306 can then be placed in the carriage 106 (FIGS. 1-2) and inserted into the slide processing unit 100. The slide clamp 303 may then be positioned to grip the proximal end of the slide 306 as illustrated in FIG. 3A. The carriage 106 is not shown for illustration. Pressure from the clamping arm 406 forces the slide 306 against the alignment arm 403 as depicted. The slide positioner 203 can then draw the slide 306 out of the carriage 106 and reposition it for processing of the sample. For example, the slide clamp 303 can rotate about 90 degrees for smearing and/or treatment of the blood sample as shown in FIG. 3B.

In one embodiment, the sample slide 306 is positioned so that a second smearing slide (not shown) drops down to contact the slide at a predefined angle (e.g., about 45 degrees). With the smearing slide resting on the sample slide 306, the slide processing unit 100 can advance the mounting plate 309 along the first pair of slide rails 312 such that the sample slide 306 moves forward until a short edge of the smearing slide reaches the enumerated location, where it contacts and waits momentarily for capillary action to fully engage the blood droplet along the edge of the smearing slide. In some implementations, the slide processing unit 100 can be configured to optically detect when the sample has reached the smearing slide using one or more sensors and/or light sources. The slide 306 is then backed out from under the smearing slide, allowing capillary action to smear the blood along the length of the slide 306. In this way, a monolayer of cells can be achieved along at least a portion of the resulting sample smear. The slide 306 with the sample can continue to be retracted until the smearing slide drops off the end of the sample slide 306 and falls to the bottom of the slide processing unit 100 where it becomes waste. In other embodiments, the slide 306 with the smeared sample can be rotated by slide positioner 203 allowing the smearing slide to drop off one side of the sample slide 306 and fall to the bottom of the slide processing unit 100 where it becomes waste. In some implementations, a drawer in the bottom of the slide processing unit 100 can catch the falling slides so that they can be retrieved by a user for disposal or cleaning and reuse. The mounting plate 309 can again position the slide 306 for further processing of the sample.

The slide 306 with the smeared sample can be moved to a desiccation position where it is air or vacuum desiccated for a brief period of time by a small fan in the slide processing unit 100. Once the smeared sample is desiccated, the slide 306 travels forward as shown in FIG. 3B to be positioned under a slide treatment system containing, e.g., methanol which is applied using, e.g., a treatment applicator (see, e.g., FIG. 7A), over the surface of the slide 306. The position of the slide 306 under the treatment applicator can be incrementally controlled along the x-axis and y-axis by the stepper or servo motors 321 for alignment with the treatment applicator. This process "fixes" the slide 306. The slide 306 can then be returned to the desiccation position and the methanol evaporated using forced air. In some embodiments, a vacuum can be used to desiccate the treated sample by drawing air across the slide 306 towards a suction tube located adjacent to the slide 306.

The slide 306 can then be repositioned under the treatment applicator for one or more treatments, in sequence, by application of, e.g., a liquid stain (or other chemical treatment) onto all or a portion of the sample. Various stains or other treatments can be discharged through the treatment applicator onto the sample on the slide 306. Additional rinsing with alcohol and/or other solvents can be accomplished using the treatment applicator to provide for Gram staining of slides. A vacuum system can remove any excess treatment from the slide and a reservoir in the bottom of the slide processing unit 100 can collect any overflow liquid from the slide 306. A drain connection can allow the overflow liquid to drain from the reservoir into an appropriate disposal system.

When the slide preparation is completed, the slide 306 can be moved under a digital microscope as shown in FIG. 3C. The digital microscope includes lenses 209 and image capture unit 212, which includes mirrors, lenses, and/or an imaging device 803 such as, e.g., CCD's or CMOS circuitry. An image of the sample on the slide 306 can be digitized automatically in a mosaic fashion and stored in memory. The digitized image can be made visible to either the local operator on the display screen 103 (e.g., a self-contained high resolution color monitor) and/or sent via the Internet and/or intranet for review by others skilled in the art of pathology. Focus may be adjusted by adjusting the position of the microscopic lenses 209 over the slide 306. The light source 206 illuminates the sample during image capture. FIG. 3D illustrates the position of the slide 306 over the light source 206 with the image capture unit 212 removed from view.

Figure 5A:
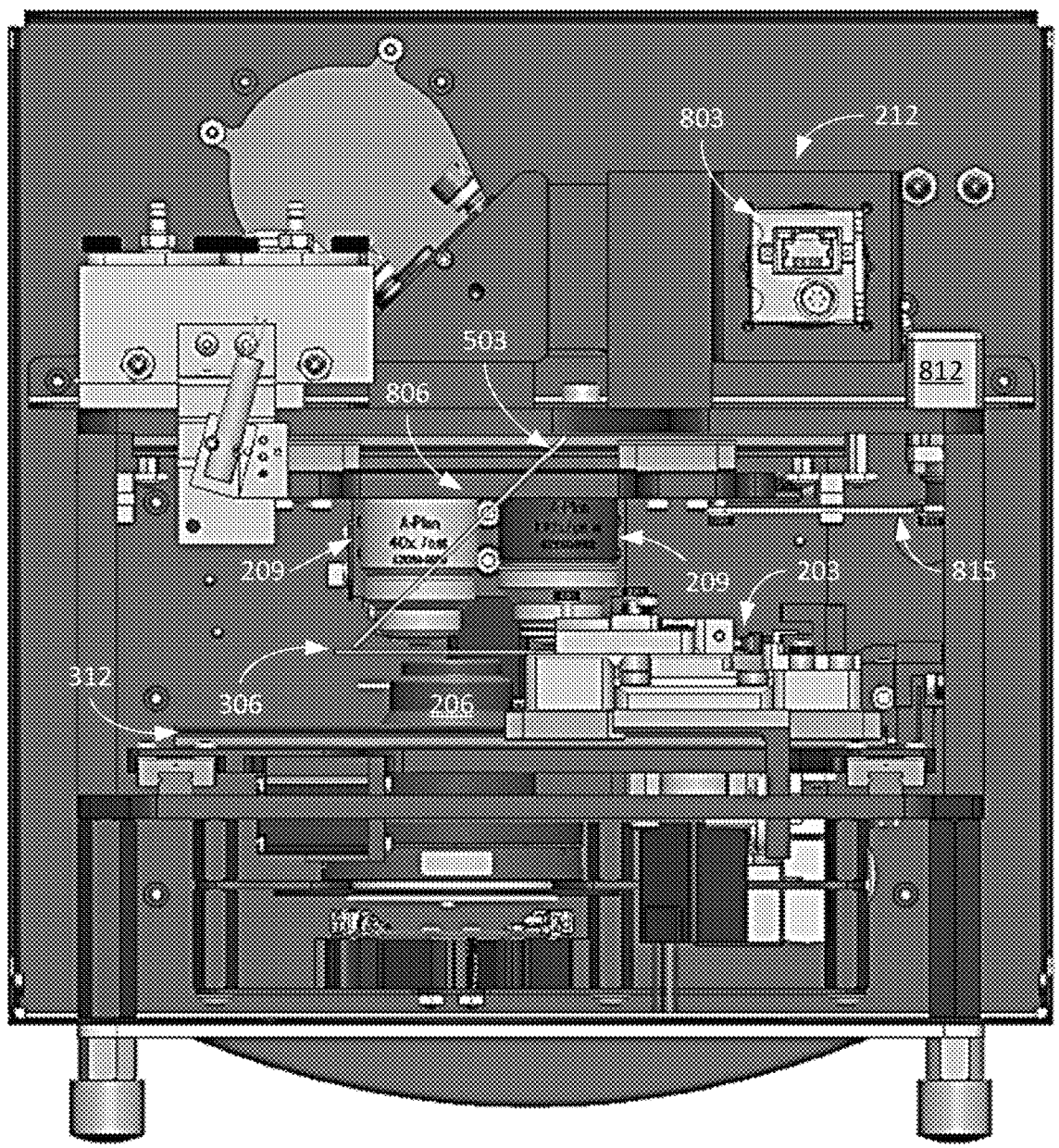
FIGS. 5A and 5B-5D are front and perspective views (respectively) of an example of the interior of the slide processing unit of FIGS. 1 and 2 in accordance with various embodiments of the present disclosure.
Figure 5B:
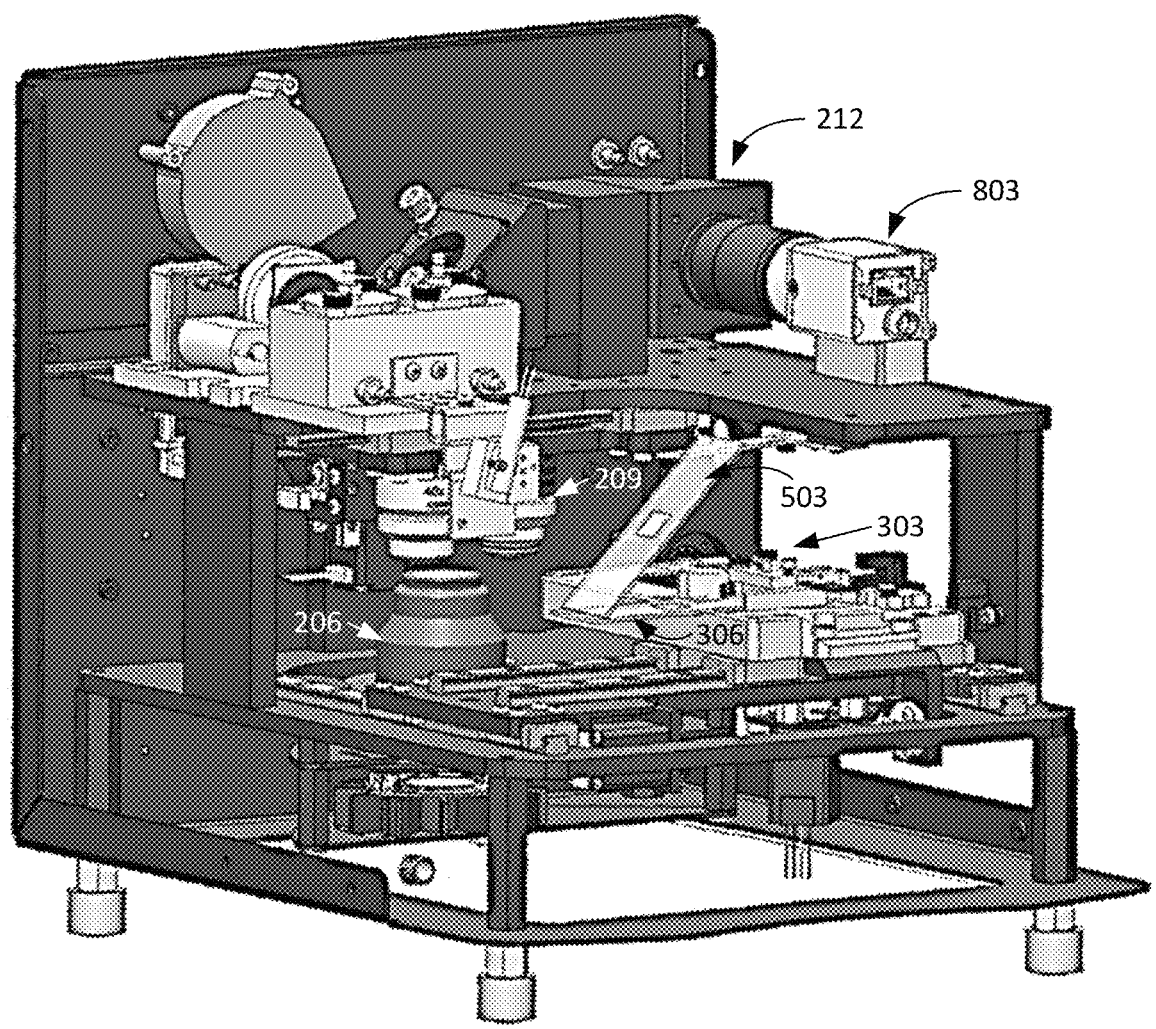

Referring to FIGS. 5A through 5D, shown are various views of an interior of the slide processing unit 100 that illustrate the orientation of the smearing slide 503 with respect to the sample slide 306. As can be seen in FIG. 5A, the sample slide 306 is positioned so that the smearing slide 503 makes contact at a predefined angle (e.g., about 45 degrees). By allowing the smearing slide 503 to freely move or rock when making contact with the sample slide, the short edge of the smearing slide 503 can rest evenly across the width of the sample slide 306. With the smearing slide 503 resting on the sample slide 306, the slide processing unit 100 can advance the mounting plate 309 along the first pair of slide rails 312 such that the sample slide 306 moves forward until a short edge of the smearing slide contacts the blood droplet and allows capillary action to draw it across the edge of the smearing slide 503. After waiting for a predefined period to allow for the capillary action, the slide processing unit 100 can retract the mounting plate 309 along the first pair of slide rails 312 such that the sample slide 306 moves backward, which smears the blood sample along the length of the sample slide 306. As the sample slide 306 is retracted from under the smearing slide 503, the smearing slide 503 can drop to the bottom of the slide processing unit 100 where it can be retrieved from at a later time. In some embodiments, the sample slide 306 can be rotated allowing the smearing slide 503 to drop off one side of the sample slide 306 to the bottom. For example, a drawer or other access can be included to allow the discarded slides to be retrieved by a user for cleaning and reuse or for appropriate disposal.

FIGS. 6A through 6D illustrate an example of a slide dispenser unit 603 that can be used to dispense smearing slides 503 onto the sample slide 306. Other slide dispenser units 603 such as, e.g., the slide dispenser unit disclosed in U.S. patent application Ser. No. 17/892,493 filed on Aug. 22, 2022, which is hereby incorporated by reference in its entirety, can be utilized in the slide processing unit 100. In this embodiment, the slide dispenser unit 603 includes a smearing slide magazine 606 configured to hold one or more smearing slides 503 and discharge single smearing slides 503 into a slide sled 609 from an end of the smearing slide magazine 606. After a sample slide 306 with a sample is received by the slide clamp 303, the slide positioner 203 can reposition it for smearing of the sample. A smearing slide 503 can be dispensed from the smearing slide magazine 606 by moving down a slide sled 609 and contacting the sample slide 306 at an angle in the range of about 30 degrees to about 60 degrees (e.g., 45 degrees). The smearing slide 503 can be dispensed from the smearing slide magazine 606 using, e.g., a blade that extends to push the smearing slide 503 out of the smearing slide magazine 606 or a wheel that turns to push the smearing slide 503 out of the smearing slide magazine 606.

As the smearing slide 503 leaves the smearing slide magazine 606, it drops into the slide sled 609 where it slides down until contacting the sample slide 306 located below. A holding bar 612 extending across the distal end of the slide sled 609 holds the smearing slide 503 in the slide sled 609 when the sample slide 306 is moved forward during smearing. The holding bar 612 can include a pivot point that extends toward the bottom of the trough of the slide sled 609 to allow the smearing slide 503 to rock about the center point (side-to-side) when making contact with the sample slide 306. For example, the holding bar 612 can have a shallow v-shape with the center point providing the pivot point or can include a point or tip that extends downward from the center of the holding bar 612 to provide the pivot point. The pivot point allows the end of smearing slide 503 to self-align with the surface of the sample slide 306, which aids in the capillary action during smearing. The weight of the smearing slide 503 provides the contact pressure onto the slide 306 with the sample.

Figure 6A:
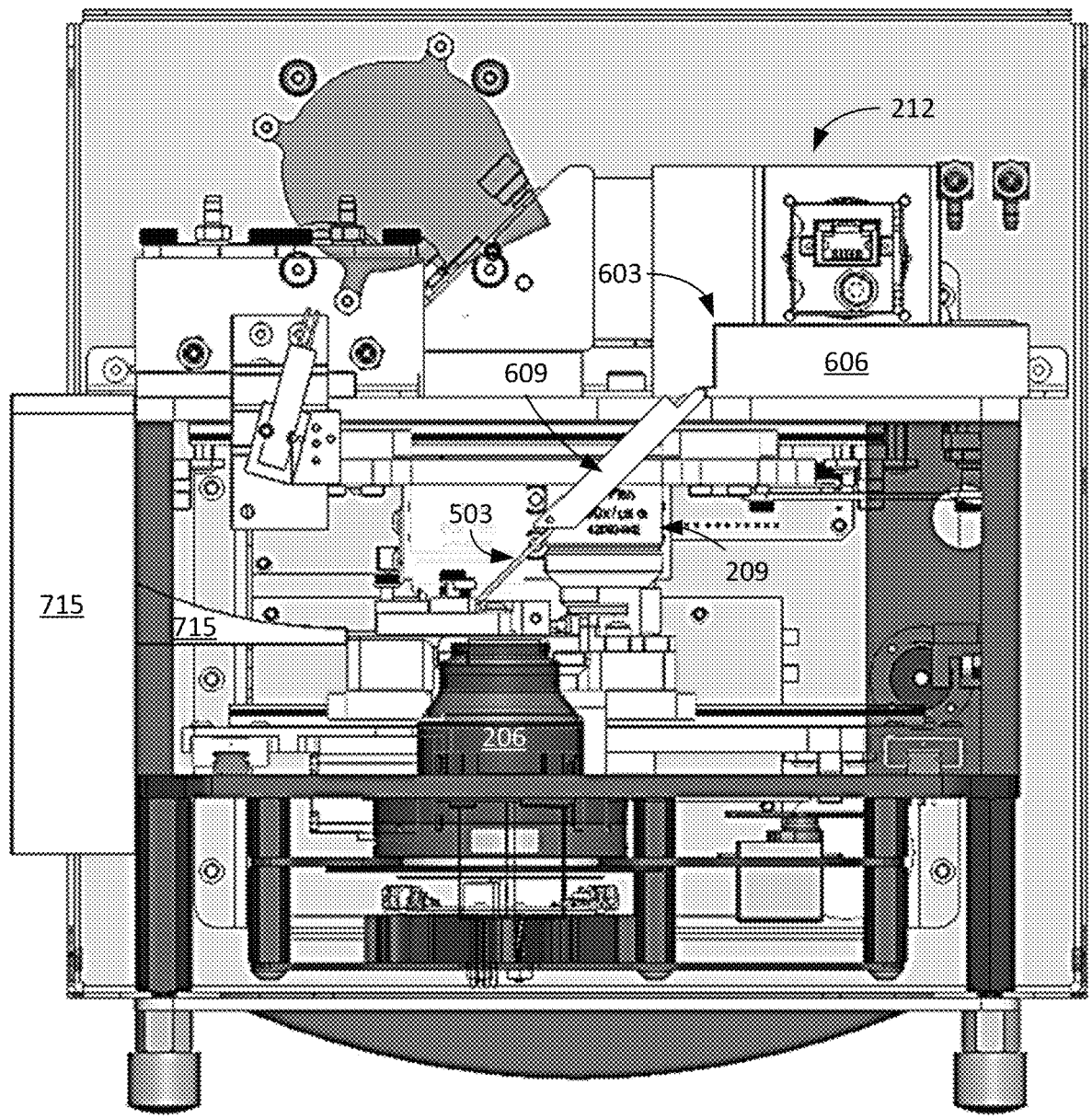
FIGS. 6A and 6B-6C are front and perspective views (respectively) of an example of the interior of the slide processing unit of FIGS. 1 and 2 including a slide dispenser unit in accordance with various embodiments of the present disclosure.
Figure 6B:
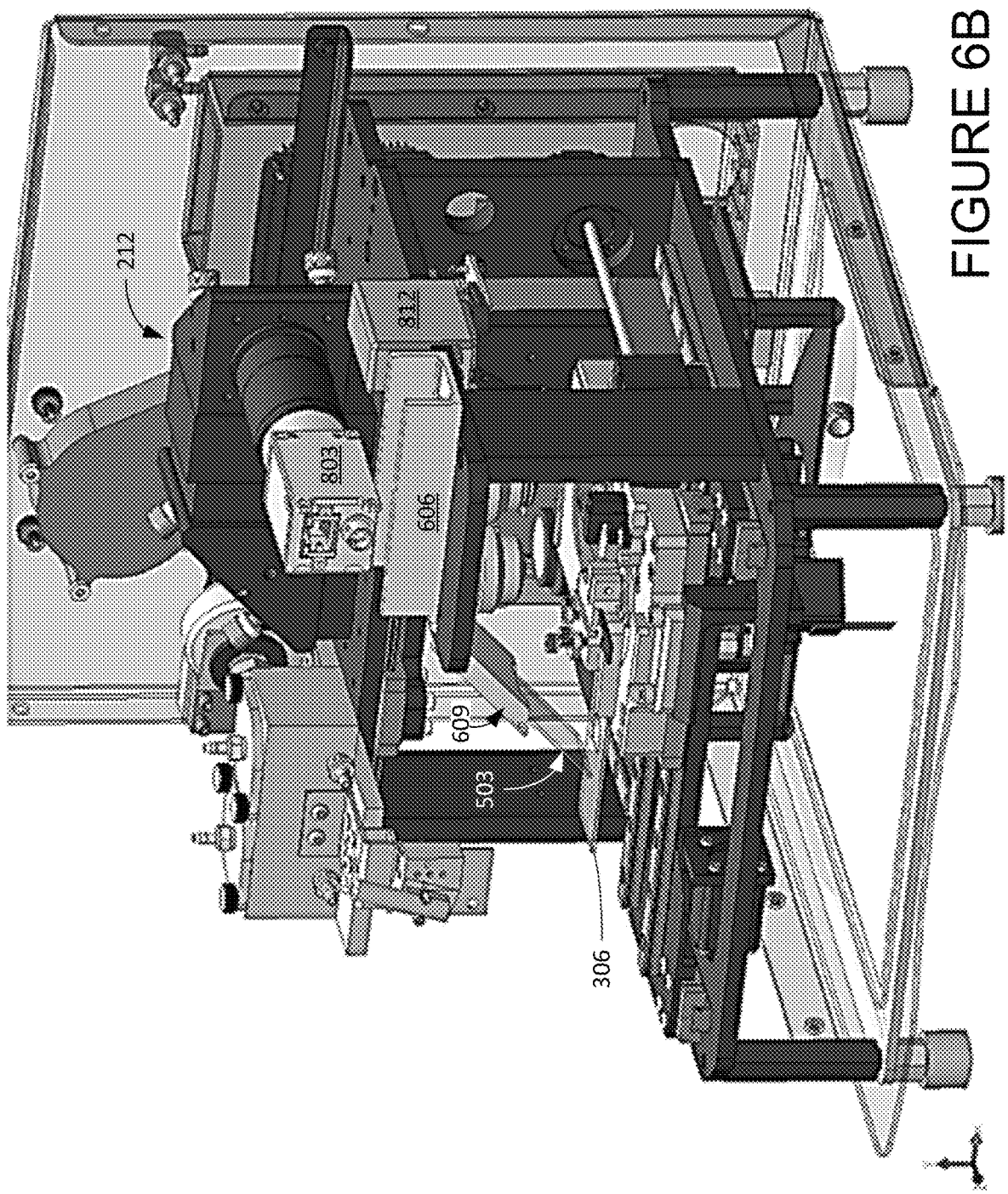
Figure 6C:
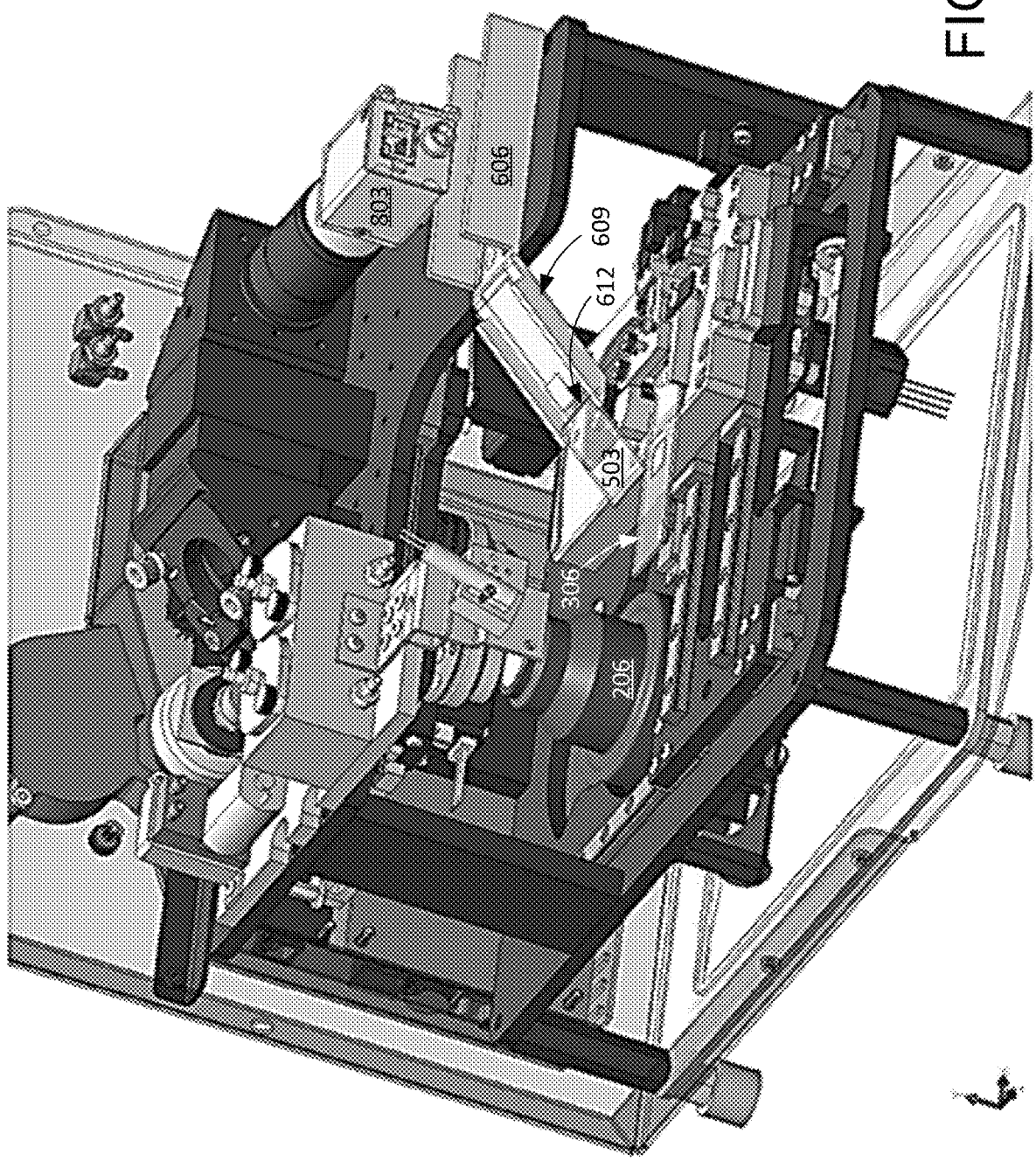

A hinged joint between the slide magazine 606 and slide sled 609, which can be controlled using a servo or stepper motor, allows the contact angle to be adjusted. In the example of FIGS. 6A-6C, the smearing slide 503 contacts the slide 306 with the sample at an angle of about 45 degrees. A capped pin (e.g., a stud, screw, bolt, etc.) can be located at the proximal end of the slide sled 609 such that it extends upward from the bottom of the trough. When the smearing slide 503 is dispensed, it moves over and past the top of the capped pin as it travels down the trough of the slide sled 609. When the smearing slide 503 reaches the sample slide 306, the capped pin can press against the opposite end of the smearing slide 503 to restrict movement of the smearing slide 503 back up the slide sled 609 when the sample slide 306 is retracted during smearing. The cap at the top of the capped pin catches the lip of the smearing slide 503 to prevent it from moving back over the top of the capped pin.

With the smearing slide 503 in position on the sample slide 306, the slide positioner 203 can advance the slide 306 until the sample contacts the lower edge of the smearing slide 503 and wait momentarily for the capillary action to fully engage the sample with the lower edge and form a meniscus. The sample slide 306 can then be retracted allowing the capillary action to smear the blood along the length of the slide 306. The slide 306 with the sample continues to retract until the smearing slide 503 drops off the end of the slide 306 and into the bottom of the slide processing unit 100. The used smearing slide 503 can be cleaned and sterilized for reuse or can be disposed of appropriately. The slide 306 with the smeared sample can then be moved to a desiccation position where the smeared sample is air desiccated for a brief period of time by a small fan in the slide processing unit 100.

Figure 7A:
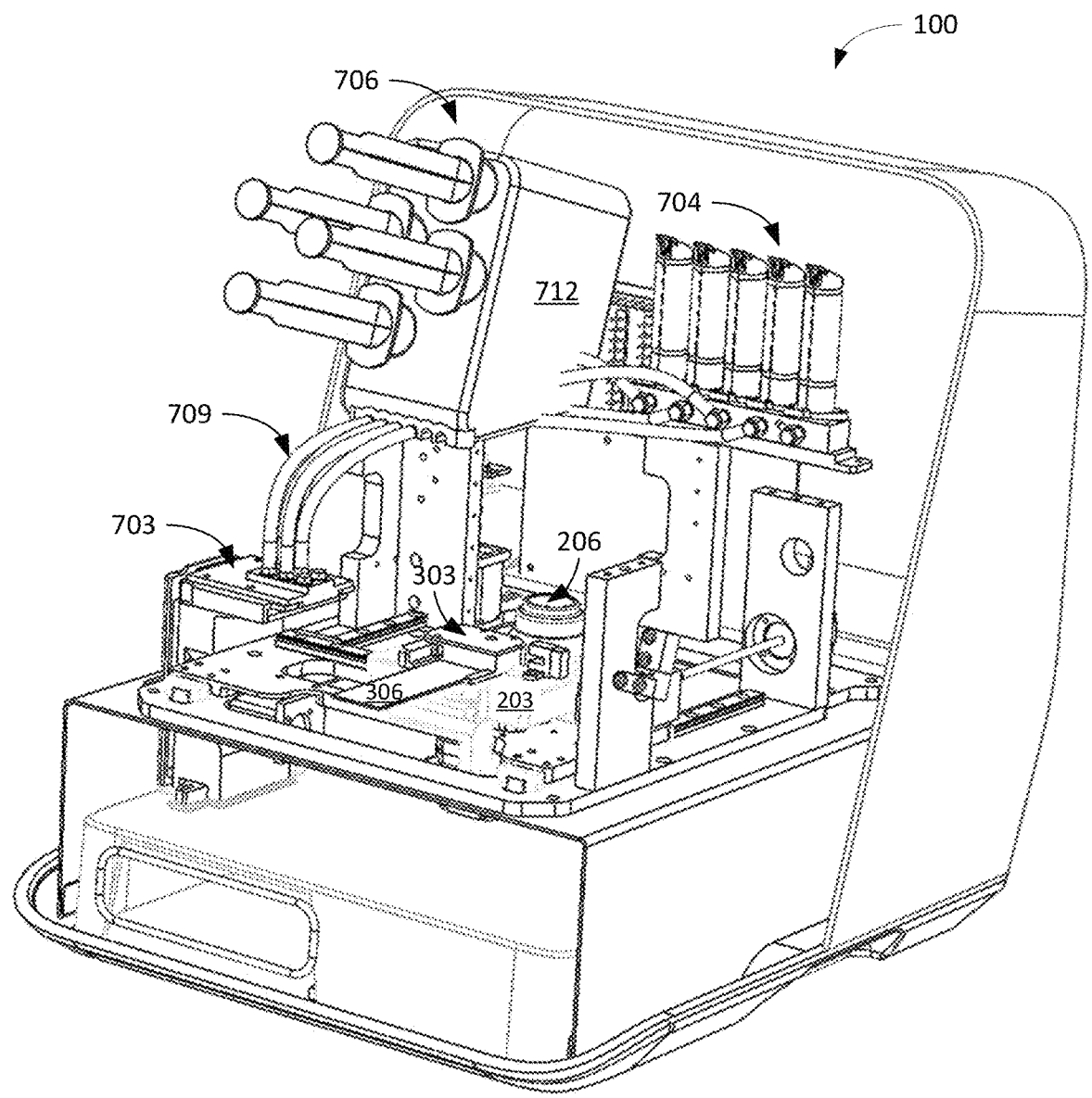
FIGS. 7A-7D illustrate an example of a slide treatment system included in the interior of the slide processing unit of FIGS. 1 and 2 in accordance with various embodiments of the present disclosure.
Figure 7B:
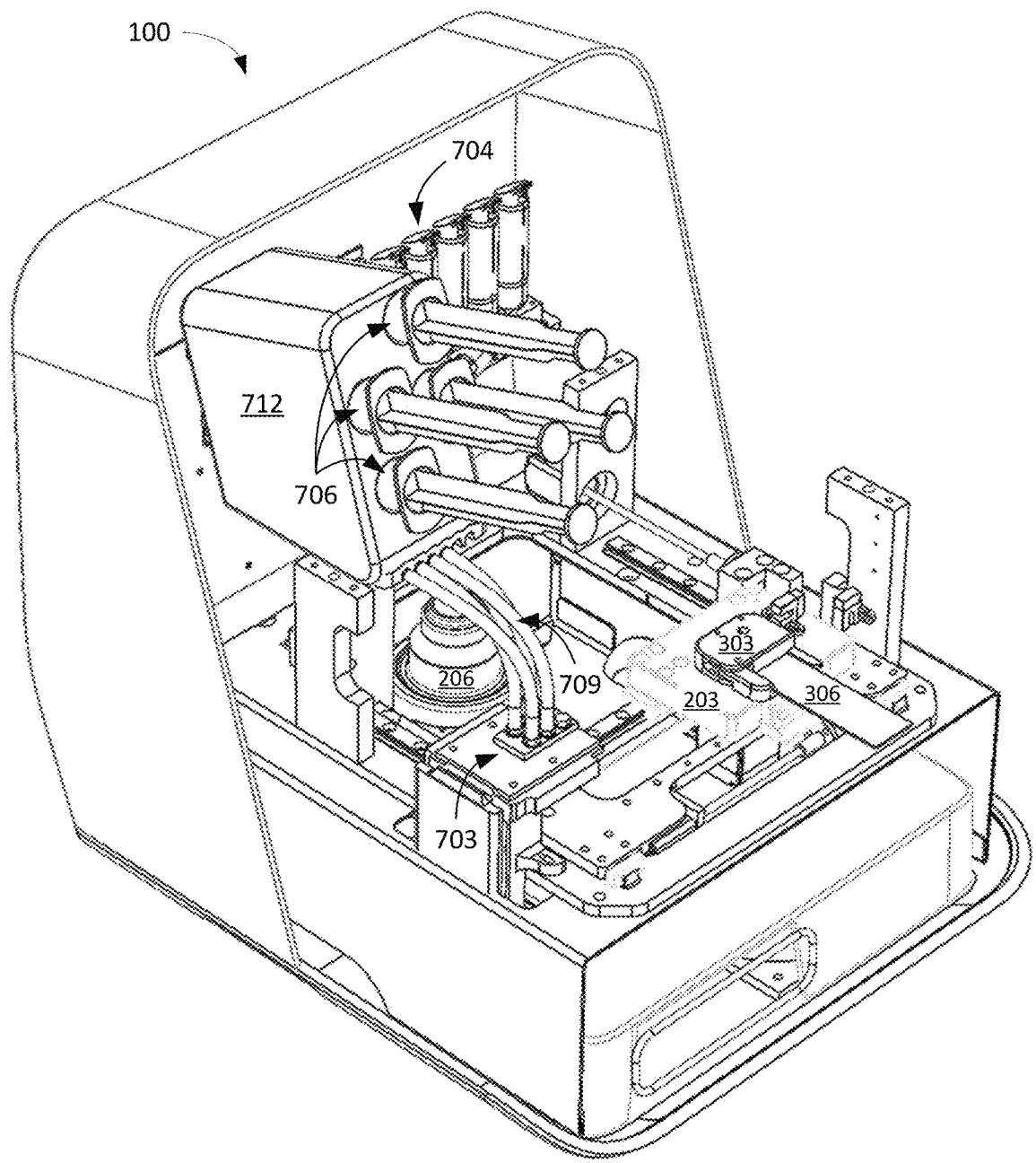

Once desiccated, the sample slide 306 can be positioned under the slide treatment applicator 703 for staining and/or other chemical treatment of the sample. Referring next to FIGS. 7A and 7B, shown is an example of the slide processing unit 100 including a slide treatment system for staining and/or other chemical treatment of the sample on the slide 306. The slide treatment system includes one or more treatment applicator 703 for application of a fluid (e.g., stain (e.g., H&E, acid fast or other stain), water, air, oil or other chemical) to the sample on the slide 306. The slide treatment system can also include one or more reservoirs 706 for holding the treatment fluids. The fluids can be provided from one or more reservoir 706 that is coupled to the treatment applicator 703 through one or more internal supply line 709 and/or can be provided through external supply lines coupled to the treatment applicator 703.

In the example of FIGS. 7A and 7B, the reservoirs 706 comprise syringes containing the treatment fluid. The reservoirs 706 can be installed in a frame 712 configured to allow their replacement. Using a syringe can avoid contamination of the treatment fluid and offer a visual indication of the amount of fluid in the reservoir 706. Reservoirs 706 can also utilize other appropriate containers such as, e.g., a collapsible container or other disposable container. The treatment fluid can be supplied to treatment applicator 703 in a controlled fashion using a supply device 704 such as, e.g., a pump or other appropriate actuator. For example, a pump (e.g., electric or pneumatic) coupled to an outlet of the reservoir 706 can be controlled to dispense a defined about of treatment fluid to the treatment applicator 703. The slide treatment system can separate supply devices 704 for each of the reservoirs 706, which may be included in the frame 712.

The treatment applicator 703 can be located within the slide processing unit 100 to apply the treatment fluid at a known or common location on the surface of the slide 306.

By positioning the sample slide 306 at a fixed position along a surface of the treatment applicator 703 and controlling dispensing of the treatment fluid, a well-defined application area can be provided. FIGS. 7A and 7B show an example of a treatment applicator 703 that is configured to apply treatment fluids. The treatment applicator 703 can be aligned so that different fluids can be applied to the same location on the sample slide 306. For example, treatment applicator 703 can include multiple openings arranged and aligned to direct different treatment fluids (e.g., a fixative, a stain, and/or a water wash) onto the sample slide 306. One or more stains and/or fixatives can be stored in individual reservoirs 706, while the water may be supplied from an external source.

The fluids may be applied to the sample on the slide 306 by dispensing a defined amount of fluid while the slide 306 is held against the treatment applicator 703 by the slide positioner 203 (or slide manipulation mechanism). After application of the treatment, excess fluid can be removed by a vacuum system. For example, a first treatment fluid can be supplied to the treatment applicator 703 from a reservoir 706 through a corresponding supply line 709. After allowing the first treatment fluid to set for a defined period of time, the first treatment fluid can be removed from the sample slide 306 by drawing a vacuum between the treatment applicator 703 and slide 306 to draw the excess fluid off the slide and into a reservoir in the bottom of the slide processing unit 100 for disposal or draining. A second treatment fluid can then be supplied to the treatment applicator 703 from another reservoir 706 through its corresponding supply line 709 and removed by vacuum after a period of time as described. This sequence can be continued as needed. In some cases, the sample slide 306 can be moved to a desiccation position between treatment applications where it is air or vacuum desiccated for a brief period of time.

In this way, various stains or other chemical treatments (or combination of stains and/or other treatments) can be applied to the smeared sample on the slide 306. For instance, a stain may be applied to an area of the smeared sample after application of a fixative. A water wash may then be applied to remove excess material and a series of air blasts or vacuum applied to dry the sample. Controlling the amount of fluid supplied to the treatment applicator 703 can avoid overflow. If excess fluids are provided (e.g., as a water flush), the fluid can flow off the slide 306 and into a reservoir in the bottom of the slide processing unit 100 for disposal or draining. A backsplash can be provided to minimize dispersion of the fluids during treatment of the slide 306.

Figure 7C:
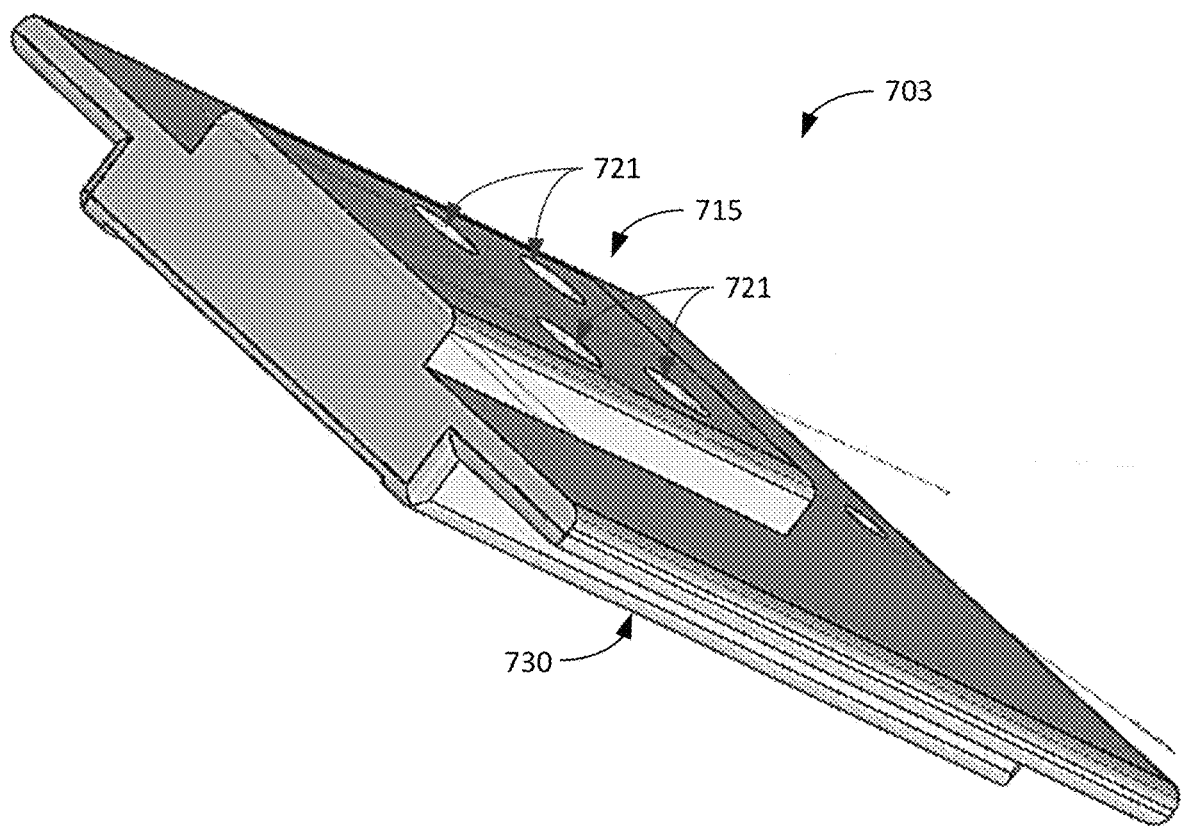
Figure 7D:
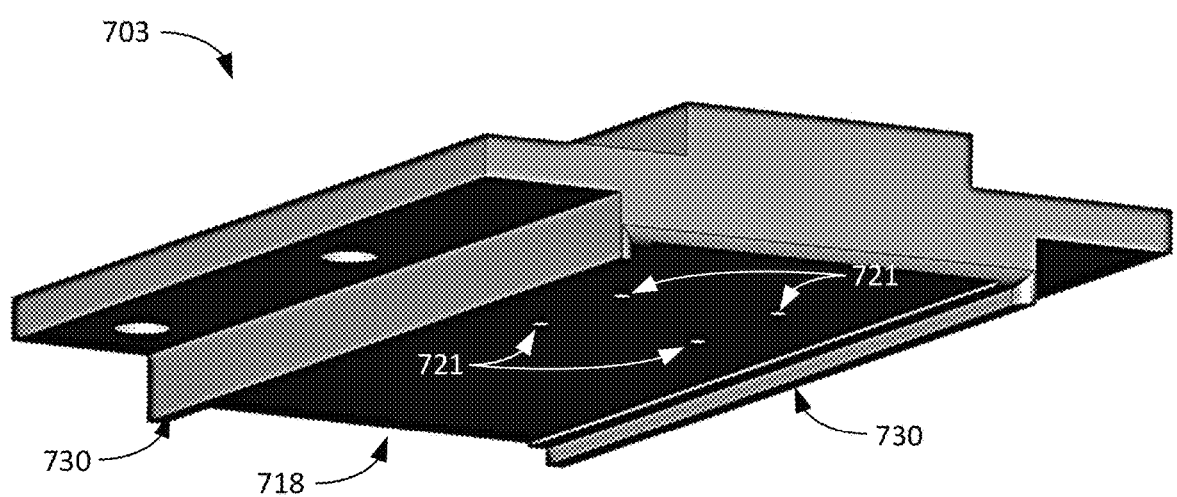

FIGS. 7C and 7D are perspective views of an example of the treatment applicator 703. The treatment applicator 703 comprises a supply surface 715 opposite an application surface 718. The treatment applicator 703 includes one or more openings 721 extending from the supply surface 715 to the application surface 718 to allow for the treatment fluid to be applied to the sample of the slide 306. Supply lines 709 can extend to the openings 721 from corresponding supply devices 704. The openings 721 can be configured as weeping jet nozzles to apply the treatment fluid. A very narrow constriction 724 in the fluid path extending between a supply line attachment point of the opening 721 and the application surface 718 can prevent washing away of the biological sample as the treatment fluid is applied. The treatment applicator 703 can also include a guide mechanism for automatic alignment and centering of the slide 306 as it is being positioned against the treatment applicator 703.

Offset rails or extrusions 730 are located on opposite sides of the application surface 718 that, when in contact with the slide 306, provide a narrow treatment channel between the application surface 718 and the surface of the slide 306. Capillary action through the treatment channel allows the fluid introduced on the slide 306 to fully occupy the entire surface of the slide 306 between the offset rails or extrusions 730. In some cases, the slide clamp 303 and/or slide positioner 203 can be moved under the treatment applicator 703 during the staining process to provide gentle agitation during application of the treatment. This can assist in complete coverage of the treatment fluid on the slide 306. The agitation movement can be provided by one or more of the motors of the slide positioner 203. A vacuum system can remove excess fluid on the slide. For example, a fan or vacuum pump can draw a vacuum at one end of the treatment channel to draw the fluid out of the channel. Additional details of the treatment applicator 703 are disclosed in U.S. patent application Ser. No. 17/990,284 filed on Nov. 18, 2022, which is hereby incorporated by reference in its entirety.

Figure 8:
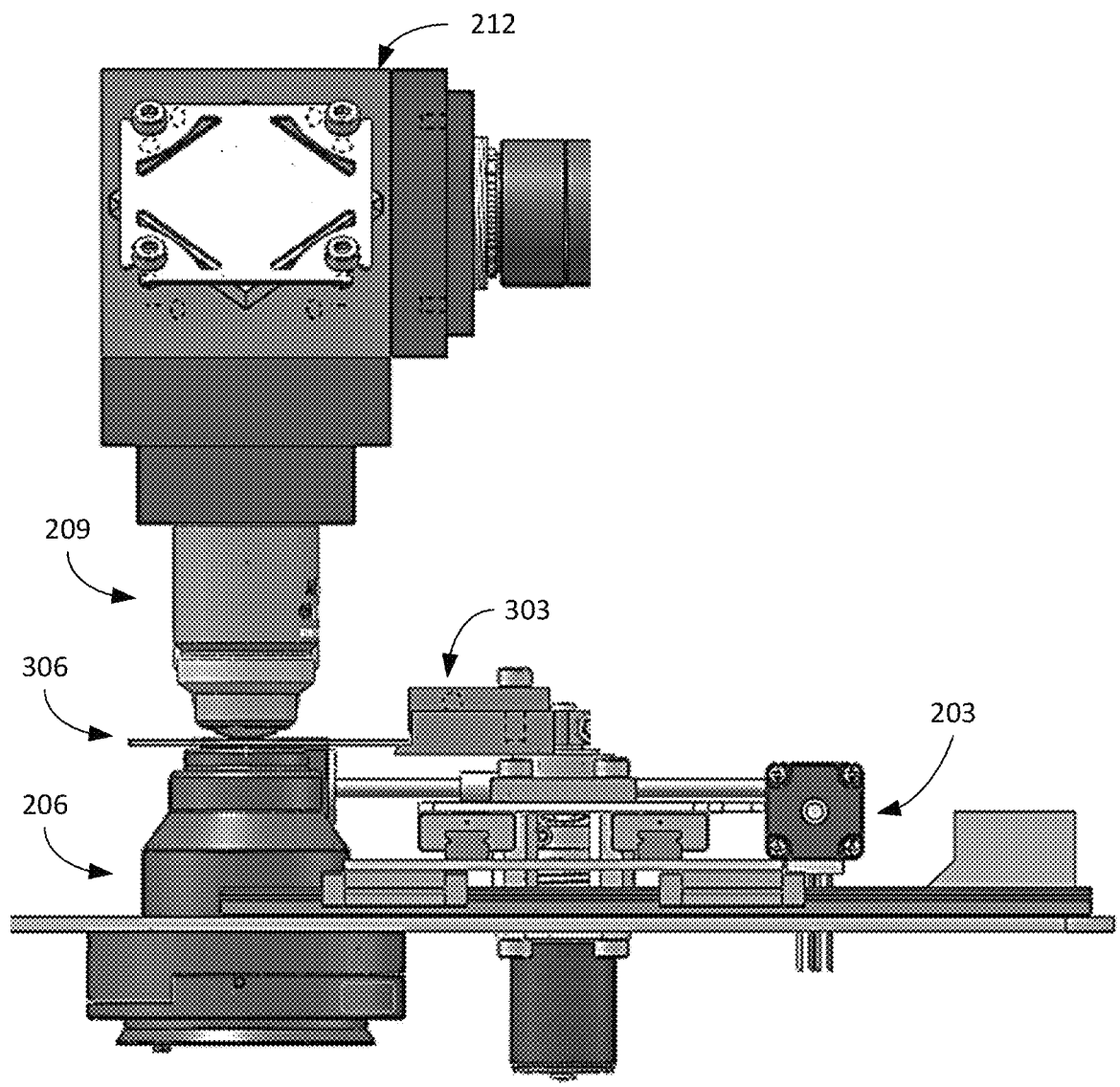
FIG. 8 illustrates an example of sample slide imaging using the slide processing unit of FIGS. 1 and 2 in accordance with various embodiments of the present disclosure.

Referring now to FIG. 8, shown is an example of sample slide imaging in accordance with various embodiments of the present disclosure. FIG. 8 shows a side view of the slide processing unit 100. The slide processing unit 100 includes a light source 206 and microscopic lens 209 with the sample slide 306 positioned between the two by the slide clamp 303 of the slide positioner 203. The light source 206 illuminates the sample on the slide 306 from opposite the microscopic lens 209. By adjusting the position of the sample slide 306 under the microscopic lens 209, imaging of the smeared sample by the image capture unit 212 can be controlled.

Figure 5C:
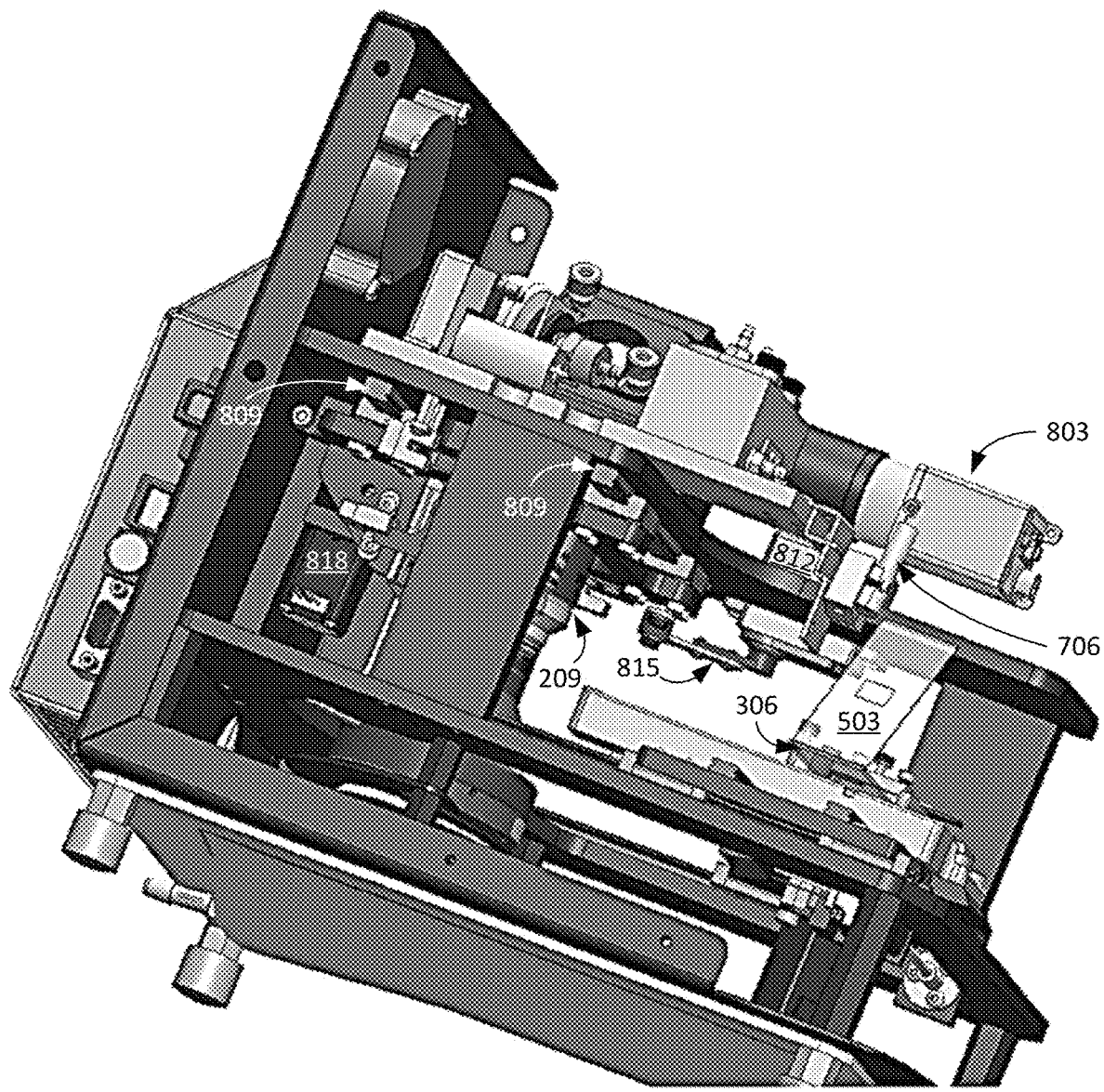
Figure 5D:
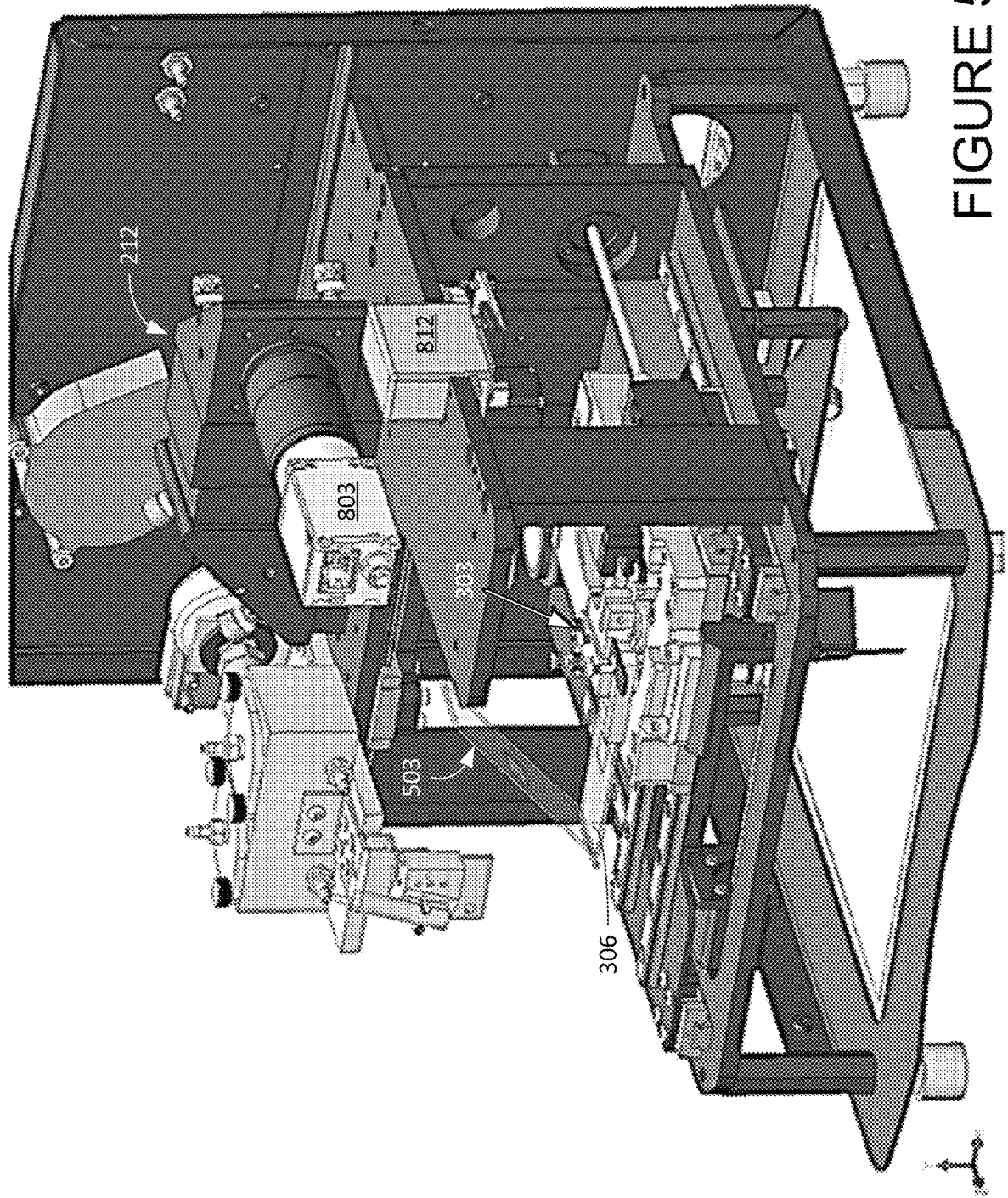

When the slide preparation is completed, the slide positioner 203 can retract and rotate the slide 306 under the digital microscope, as illustrated in FIGS. 3C and 3D, utilizing the light source 206, one or more microscopic lenses 209 and the image capture unit 212 for imaging. As shown in FIG. 5A, the light source 206 is positioned below the level of the sample slide 306 for illumination during imaging. Sufficient cooling is included to prevent distortion of the captured images by heat from the light source 206. A plurality of microscopic lenses 209 can be positioned above the level of the sample slide 306. One of the lenses 209 can be selected for imaging by the image capture unit 212 and linearly adjusted for focus on the sample. As can be seen in FIGS. 5A, two or more microscopic lenses 209 can be mounted on a common baseplate 806, which is supported by a pair of guide rails 809. By moving the baseplate 806 along the guide rails 809, the desired lens magnification can be selected. A motor 812 (or solenoid) can be controlled to shift the baseplate 806 to align the appropriate lens 209 with the image capture unit 212. As depicted in FIG. 5C, linkage 815 can be used to translate the rotational motion of the motor 812 to the linear motion of the baseplate 806. In other embodiments, the lenses 209 can be mounted to a baseplate 806 that can be rotated by a motor to move the desired lens into position. Other arrangements can also be used. Sensors and/or mechanical stops can be included to ensure proper alignment of the selected lens with the image capture unit 212. A dust shield can be provided over the back side of the lenses to avoid accumulation of dust or other dirt on the lenses 209.

In some implementations, calibration of the digital microscope can be performed prior to imaging of the sample to ensure a dynamic limit is realized on a focusing motor to prevent the objective from touching the surface of the slide. For example, a ground-glass calibration can be carried out for one or more of the lenses 209 after the slide preparation is completed or can be performed prior to treatment of the slide 306. If calibration is performed after the slide preparation, the slide positioner 203 can preposition the slide 306 under the digital microscope, as illustrated in FIGS. 3C and 3D for calibration. If the calibration is preformed prior to treatment, the sample slide 306 can be obtained from the carriage 106 (FIGS. 1-2) as previously described. The slide clamp 303 can be positioned to grip the proximal end of the slide 306 to draw the slide 306 out of the carriage 106 and reposition it for processing and/or calibration. For example, the slide clamp 303 can rotate about 180 degrees for calibration of the microscope lens as shown in FIGS. 3C and 3D for calibration.

Figure 9A:
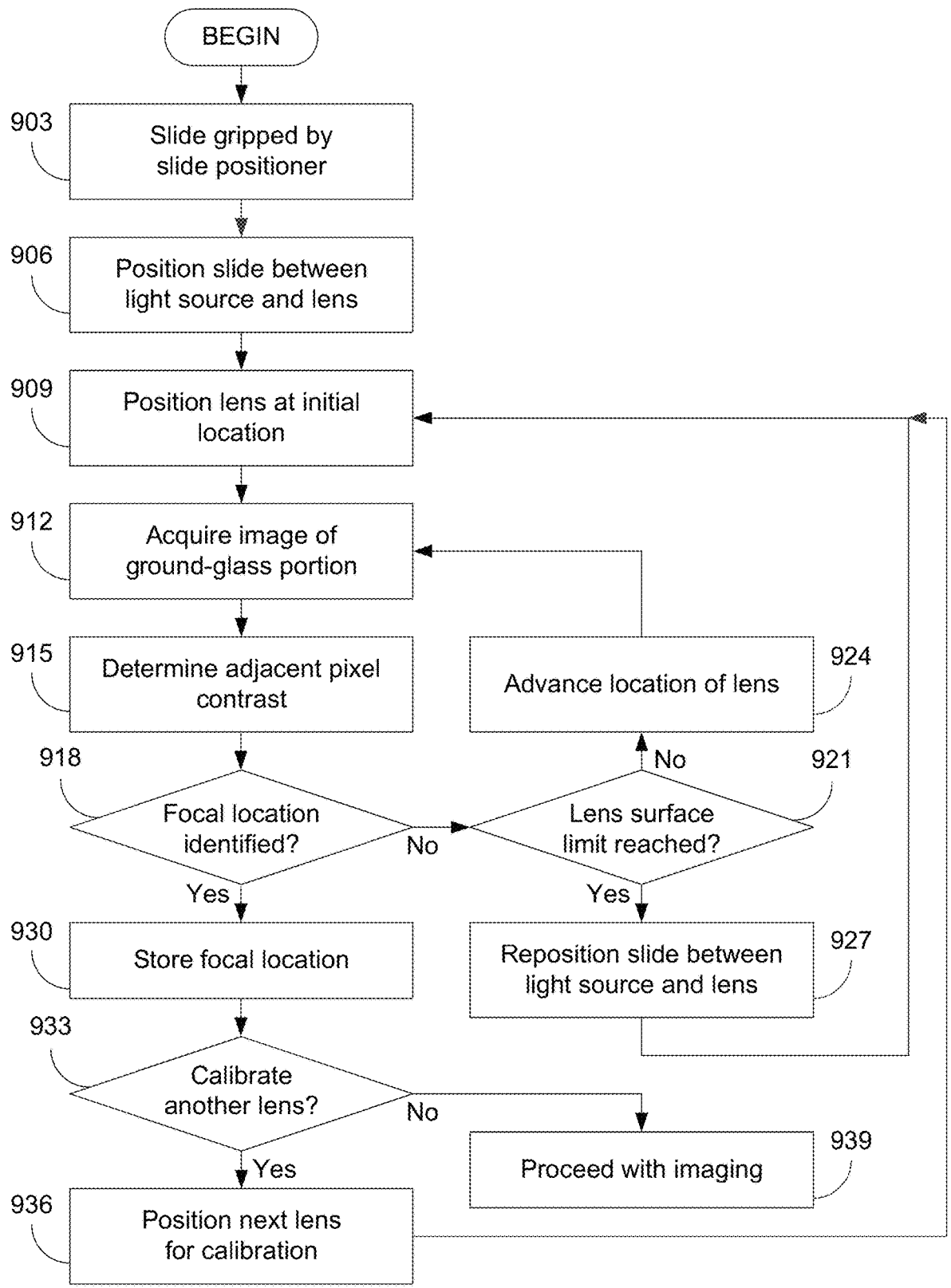
FIGS. 9A and 9B illustrate an example of lens calibration in accordance with various embodiments of the present disclosure.

Referring to FIG. 9A, shown is a flowchart illustrating an example of a ground-glass calibration process that can be automatically implemented by the slide processing unit 100. A sample slide 306 can comprise a ground-glass portion (e.g., across a surface at one end of the slide 306) that can be used for calibration of the digital microscope. An image processing unit (IPU) system application executed by the slide processing unit can control the calibration process in an automated fashion. The texture of the ground-glass can be utilized to determine an optimal (or best) focus location for the lens 209 under calibration. The calibration process may be executed for each slide being examined by the slide processing unit 100. In alternative embodiments, the calibration process may be carried out after the slide processing unit 100 is started up for operation or can be initiated by a user through a display screen (or other user interface) of the slide processing unit 100 or remotely via a secure connection with a user device.

Beginning at 903, the slide 306 is gripped by the slide positioner 203, which supports the slide 306 for repositioning for processing. This may begin, e.g., after the initial acquisition of the slide 306 from the carriage 106 (FIGS. 1-2) or after treatment of the slide is completed. At 906, the slide 306 can be repositioned by the slide positioner 203 to place the ground-glass portion between the light source 206 and a lens 209 of the digital microscope for calibration of a lens 209. For example, the positioning of the slide 306 can be predefined to approximately align a center of the ground-glass portion between the light source 206 and lens 209 being calibrated. In another example, the digital microscope can monitor light from the light source 206 passing through the slide to determine if the ground-glass portion is positioned between the light source 206 and the lens 209. The lens 209 can then be positioned at an initial (or "home") location away from the slide surface at 909. This can be a starting position at the limit of the lens adjustment furthest away or most distal from the slide 306.

With the slide 306 in position and illuminated by the light source 206, an image of the ground-glass portion is acquired by the imaging device 803 (e.g., CCD's or CMOS circuitry) via the lens 209 at 912. The variation produced by the ground-glass can produce differences in the light acquired by individual pixels of the imaging device 803. Contrast between adjacent pixels of the acquired image is then analyzed at 915 to determine focus of the image. The highest possible contrast equates to the best or optimal focus. This can be carried out by measuring the contrast (black or white) between the adjacent pixels and determine if they are within a defined threshold. For example, if the contrast between the adjacent pixels is at or above 95% (or other defined threshold), then the location of the lens 209 where the image was acquired may be considered to be the focal location for the lens 209.

Figure 9B:
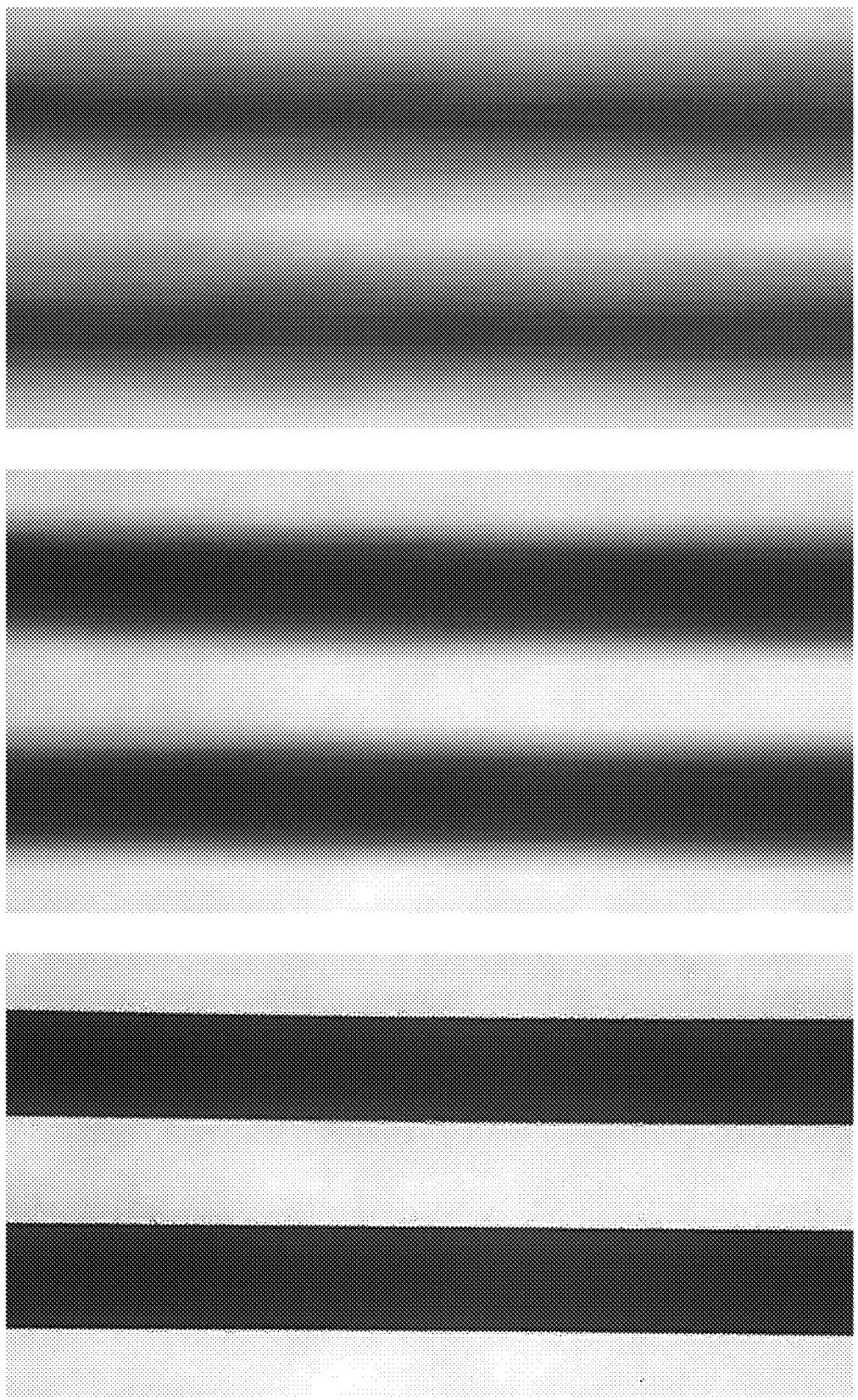

This contrast evaluation can be illustrated by the phantom images of FIG. 9B. The top image of FIG. 9B illustrates an example of an image that was acquired with the lens 209 in its initial location. The lack of focus produces substantial blurring between the pixels resulting in small variations in contrast between adjacent pixels of the image. As the location of the lens 209 is adjusted towards the slide 306, the focus of the image improves as illustrated in the middle image of FIG. 9B. While the contrast between adjacent pixels has improved, there is still blurring along the edges of the bands. The bottom image of FIG. 9B illustrates the sharp contrast that can be achieved when the location of the lens 209 is at an optimal focal location. In this case, the contrast between adjacent pixels satisfies the defined threshold. Through a series of steps, the lens 209 can be moved toward the slide and individual images from each step can be evaluated to obtain an optimal or best focus. This can include driving the lens 209 minimally through the optimal focal plane.

Returning to FIG. 9A, the focal location can be identified at 918. If the contrast does not satisfy the defined threshold or other defined contrast characteristic, then at 921 it can be determined if a lens surface limit has been reached. The lens surface limit can be a preset travel limit of the lens 209 to prevent the objective from contacting the surface of the lens 209. For example, the lens location can be regulated to prevent the lens 209 from being drive below a location (or travel distance) that is defined as the lens surface limit. This can be defined to ensure a minimal distance between the slide surface and the lens objective to avoid damage to the slide 306 or the lens 209 or to avoid contamination of the lens 209 by the sample on the slide 306.

If the lens surface limit has not been reached at 921, the location of the lens 209 can be advanced toward the slide at 924 and another image of the ground-glass portion acquired at 912. The lens 209 can be advanced by a defined distance or can be advanced by a dynamically adjusted distance (e.g., based upon the contrast of adjacent pixels of the acquired image). This image can then be analyzed at 915 to determine the adjacent pixel contrast as previously discussed. If the analysis does not result in the identification of the focal location at 918, the process can continue. If the lens surface limit is reached at 921 before the focal location is identified, then the slide 306 can be repositioned between the light source 206 and the lens 209 by the slide positioner 203 at 927 to allow for imaging of a different section of the ground-glass portion of the slide 306. The process can return to 909 where the lens 209 can be returned to the initial location and the image acquisition and contrast determination can be repeated as previously described.

If the contrast between adjacent pixels satisfies the defined threshold or contrast characteristic at 918 then the current location of the lens can be defined as the focal location for that lens 209 and the information can be stored in memory at 930. The location of the best or optical focus can be recorded in non-volatile memory, which can then be recalled during all microscope actions. In some implementations, identification of the optimum focal location can include further advancing the location of the lens 209 at 924 and acquiring another image at 912 to confirm that the contrast of the adjacent pixels still satisfies the defined threshold or regresses to no longer satisfy the defined threshold. This can indicate that the optimum focal location is between the two locations or that the lens 209 has traveled past the optimum focal location. Focusing on the sample slides 306 can be limited based upon the focal location and can preclude the user from driving the lens 209 beyond a limit set based upon the focal location to prevent the lens objective from contacting the sample or the slide.

After the focal location is stored at 930, it can be determined at 933 whether calibration of another lens 209 is needed. If another lens 209 is to be calibrated, then the next lens 209 is positioned for calibration at 936 and the process returns to 909 where the calibration begins again. If the lens calibration is complete at 933, then the process can proceed to 939 where the lens 209 can be adjusted to the identified focal location and imaging of the sample can proceed.

With the selected microscopic lens 209 in position, the lens 209 and/or light source 206 can be adjusted for examination and imaging of the sample. For example, the selected lens 209 can be adjusted using a stepper or servo motor 818. Using appropriate gearing or thread pitch allows for very fine adjustment of the lens 209, which improves the ability to focus the image for capture. The location of the surface of the sample slide 306 can initially be determined by focusing on an etched portion of the slide 306. Focus of the microscopic lens 209 can then be automatically carried out by the slide processing unit 100 or manually carried out by the user of the slide processing unit 100. A hard stop can be provided to prevent the lens 206 from striking the sample slide 306 during adjustment.

With the treated sample under the digital microscope, it is possible to automatically identify a monolayer of the smeared sample. As the sample is smeared across the slide 306, the thickness of the sample on the slide 306 will decrease or be feathered out until the sample smearing is completed. Towards the end of the smearing, there is an area where a monolayer of cells exists (i.e., where the cells are one cell thick, nominally 3-5 microns). In some implementations, the location of the monolayer can be determined by measuring the light passing through the slide. Initially, light can be measured through the glass of the slide 306 on both sides of the sample where no sample exists. This allows the total amount of light coming through clear glass to be determined. The digital microscope can then search for an area where a predefined percentage of the total light is detected passing through the smeared sample. For example, when the light passing through an area of the smeared sample is about 57% of the total light through clear glass, then a monolayer exists in that area. In this way, the location of a monolayer can be determined in the smeared sample.

The slide processing unit 100 can be used to automatically acquire images of treated samples and transmit the images for storage and/or evaluation at a remote location. Images of the sample on the slide 306 can be digitized automatically in a mosaic fashion using the image capture unit 212, which includes mirrors, lenses, and/or the imaging device 803. The images may be initially acquired at a high resolution and stored in memory in the slide processing unit 100. The location (or relative position) of each of the mosaic images, the operating conditions of the light source 206, lens 209 and/or image capture unit 212, and/or identification of the sample slide 306 can also be stored in memory. In some implementations, the slide processing unit 100 can also send the acquired images for external storage in a local or remote data store. For example, the images can be transmitted to secure data store in the cloud. The slide processing unit 100 can be configured to send the images for external storage at the time of acquisition or store the images in the memory of the slide processing unit 100 at the time of acquisition and send them for external storage at a later time. For example, the images can be transmitted at a scheduled time (e.g., after normal business hours when usage of the network is low) or when the slide processing unit 100 is idle.

Figure 10:
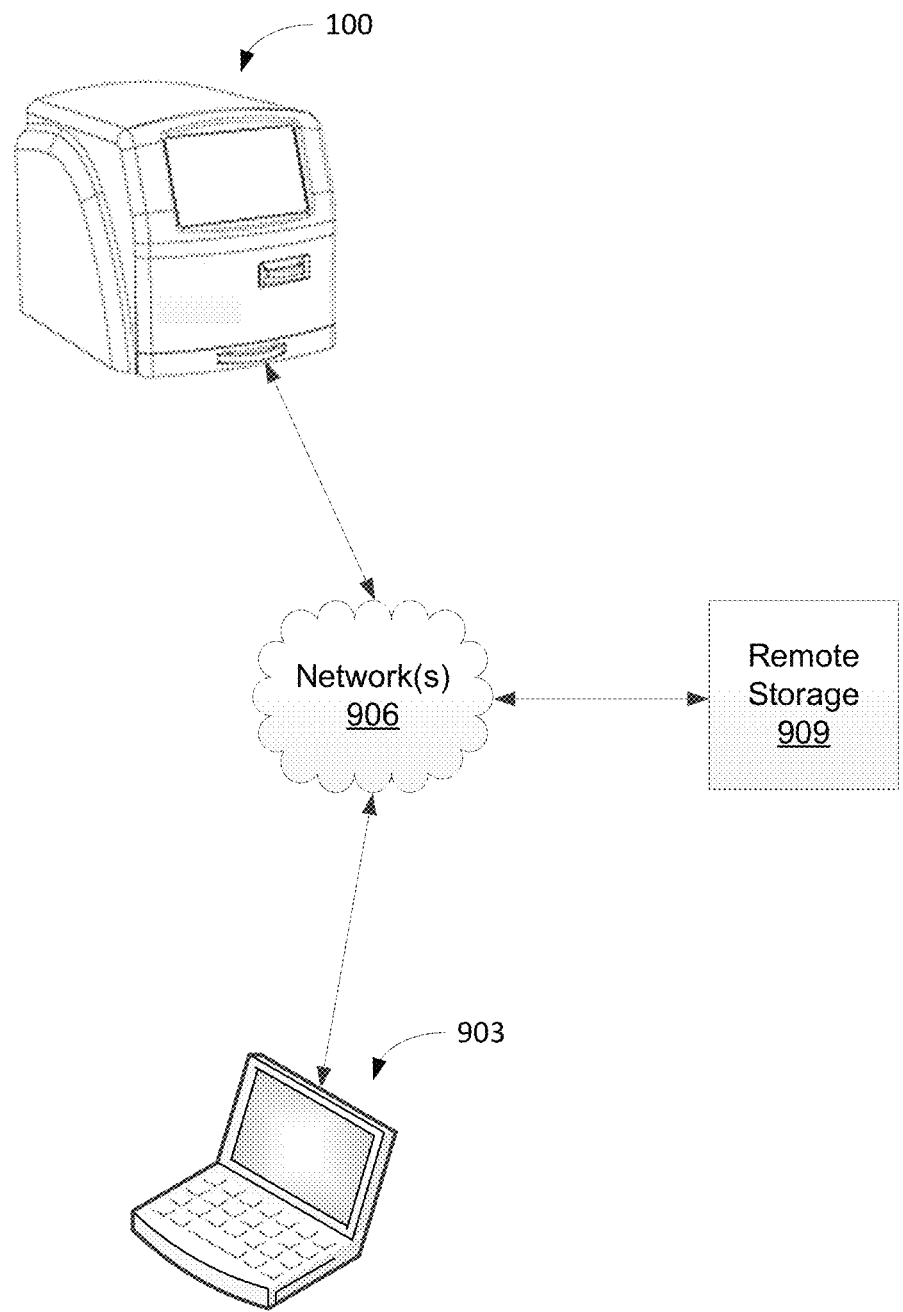
FIG. 10 is a graphical representation of a system for remote access and storage of slide processing using a slide processing unit of FIGS. 1 and 2 in accordance with various embodiments of the present disclosure.

The digitized images can be made visible to either the local operator on the display screen 103 (FIG. 1) and/or transmitted for review by others skilled in the art of pathology. FIG. 10 is a graphical representation illustrating a system for remotely accessing and/or controlling the slide processing unit 100. For example, communication can be established between the slide processing unit 100 and a user device 903 (e.g., a computer, tablet, smart phone, etc.) via a secure network connection over one or more networks 906 (e.g., an intranet, the Internet and/or a cellular network). As discussed, the slide processing unit 100 can store the image data in local memory (or storage) and/or can store the image data in remote storage 909 for later access. The remote storage may be representative of one or more data stores as can be appreciated.

In addition, the data can be transmitted to the user device 903 of examination and evaluation. The user device 903 is representative of a plurality of devices that may be coupled to the network 906. The user device 903 may comprise, for example, a processor-based system such as a computer system. Such a computer system may be embodied in the form of a desktop computer, a laptop computer, personal digital assistants, cellular telephones, smartphones, web pads, tablet computer systems, or other devices with like capability. The user device 903 can include a display such as, for example, a liquid crystal display (LCD) displays, gas plasma-based flat panel displays, organic light emitting diode (OLED) displays, electrophoretic ink (E ink) displays, LCD projectors, or other types of display devices, etc.

To improve the data transmission and reduce latency, the resolution of the acquired images can be reduced and compressed prior to transmission to the user device 903. For example, the resolution of the acquired imaged may be reduced by a predefined amount (e.g., 10 to 1), which does not affect the image quality for review by the user, and sent to the user device 903 using an appropriate compression format (e.g., jpeg). If a higher resolution image is requested by the user during evaluation of the images, then the slide (or image) processing unit 100 can communicate the higher resolution information to the user device 903 for evaluation.

Examination of the sample in the slide processing unit 100 can also be actively controlled either locally through the display screen 103 (or other user interface) or remotely via a secure connection with the user device 903. For example, a pathologist or other user can initially examine the lower resolution images to determine if a condition or problem exists. If there is a question regarding the sample, the higher resolution images can be requested for further examination. In some cases, the higher resolution images of specific areas of the sample can be requested by the pathologist or user to reduce the amount of data being requested. It is also possible for the pathologist or user to actively control the imaging of the sample in real time. This can be especially beneficial if a feature of the sample was captured over multiple images.

In some implementations, the pathologist or user can actively control some of the features of the slide processing unit 100 from a remote location. For example, examination of the treated sample can be remotely controlled in real time over the secure connection with the user device 903. Images can be transmitted to the user device 903 while commands are sent through an interface on the user device 903 to actively control viewing of the images. The commands can allow the pathologist or user to control the examination of the different areas of the stored image data or, with the sample slide 306 in the slide processing unit 100, to control the active imaging of the sample in the slide processing unit 100. Images that have been stored in the remote storage 909 can also be accessed through the user device 903.

In some cases, the user can implement real time control of the slide processing unit 100 with real time images being streamed to the user device 930. Features such as, but not limited to, control of the iris of the light source 206, remove switching of microscopic lenses (or objectives) 209, and control of viewing area can be controlled by a remote operator. Linear adjustment of the lens and/or selection of different lenses can also be controlled remotely. For instance, the pathologist or user can pan between different areas or change the resolution (or magnification) of the image(s) to focus the examination as desired. The pathologist or user can also control the slide processing unit 100 while images are being captured of the sample in real time. In this way, the pathologist can examine the sample as if the slide 306 were at his or her location.

After imaging and/or examination of the sample is complete, the sample slide 306 can be returned to the carriage 106 by the slide positioner 203. The user can then remove the sample slide 306 from the slide processing unit 100 for retention or disposal. For example, the user can open the carriage 106 and pull the sample slide 306 out of the grasp of the slide clamp 303. The processed sample slide 306 can be reinserted into the slide processing unit 100 for subsequent examination using the microscopic lenses 209 and image capture unit 212 (FIG. 3C). The alignment arm 303 of the slide clamp 303 and the guide shoulder 427, slide stop 430 and clamp stop 433 of the mounting plate 309 (FIGS. 4A-4F) allow for consistent positioning of the sample slide 306 during the subsequent imaging. The sample slide 306 can be repositioned by the slide processing unit 100 to return to a location of a previously acquired image for reexamination by a user. In other implementation, the sample slide 306 can be deposited in the bottom of the slide (or image) processing unit 100 for subsequent removal and disposal. For example, the sample slide 306 may be released and deposited in a receptacle in the bottom of the slide processing unit 100.

Tissue samples may also be processed by the slide processing unit 100 in a similar fashion. Thin slices of tissue may be placed on a slide 306 and introduced to the slide processing unit 100. As smearing would not be needed, the sample slide 306 would progress through the staining process described earlier (e.g., desiccation and/or chemical treatment) and positioned under the microscope lens 209 for digitization and/or review. In some implementations, a lump section of tissue may be introduced into the slide processing unit 100 in an appropriate sample jar and frozen section preparation may be automatically accomplished. The lump section can be dehydrated by forced air and/or vacuum desiccation with heat. The tissue can then be sectioned using, e.g., a piezo electrically driven knife (or sharp edge) and the resultant thin sections automatically placed on a slide 306. The sample slide 306 would then progress through the treatment process (e.g., staining) described earlier and positioned under the microscope lens 209 for digitization and/or review.

Figure 11:
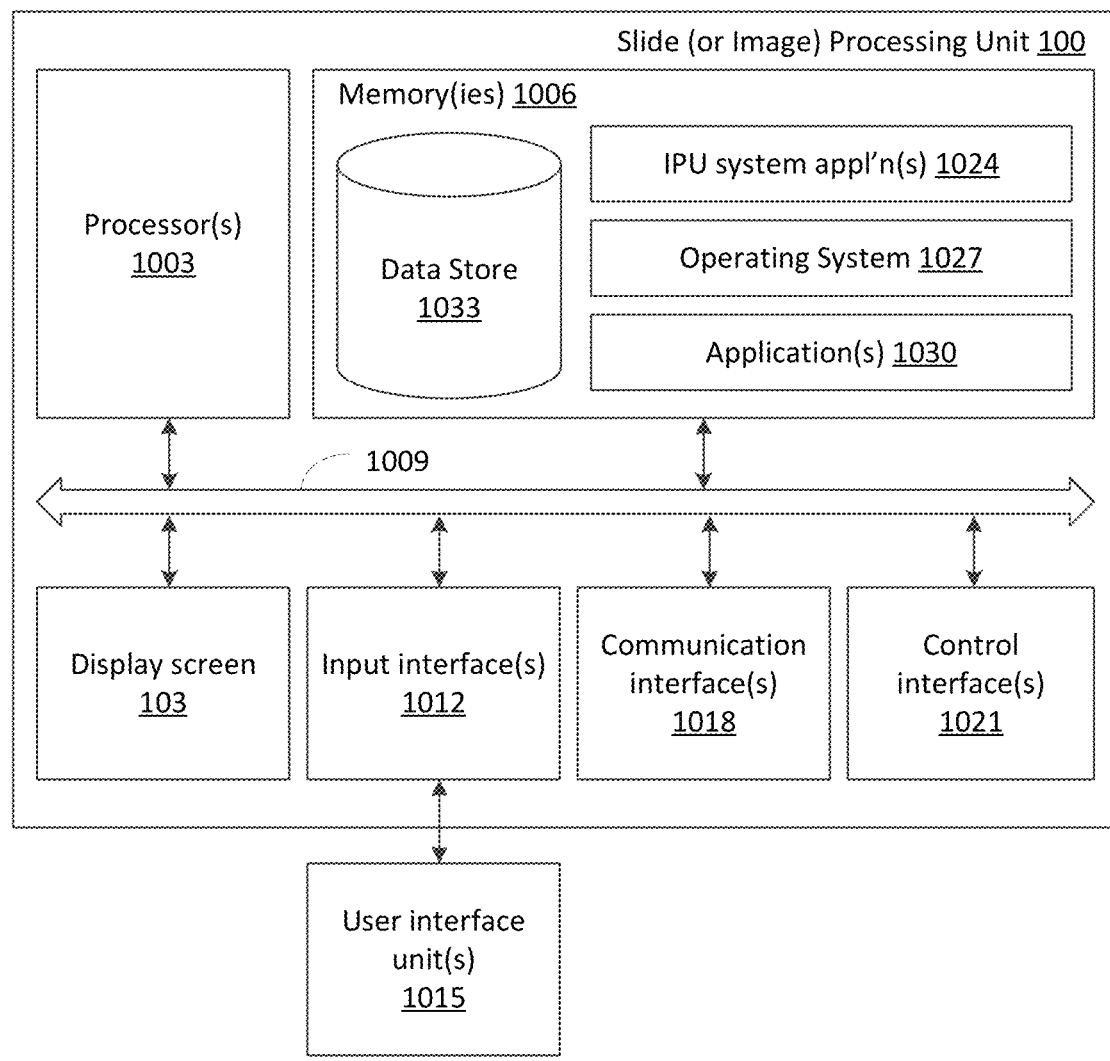
FIG. 11 is a schematic block diagram that illustrates an example of processing circuitry employed in the slide processing unit of FIGS. 1 and 2 in accordance with various embodiments of the present disclosure.

With reference now to FIG. 11, shown is a schematic block diagram of an example of processing circuitry that may be used to control the operation of the slide (or image) processing unit 100 in accordance with various embodiments of the present disclosure. The processing circuitry includes at least one processor circuit, for example, having a processor 1003 and a memory 1006, both of which are coupled to a local interface 1009. To this end, the processing circuitry 1000 may be implemented using one or more circuits, one or more microprocessors, microcontrollers, application specific integrated circuits, dedicated hardware, digital signal processors, microcomputers, central processing units, field programmable gate arrays, programmable logic devices, state machines, or any combination thereof. The local interface 1009 may comprise, for example, a data bus with an accompanying address/control bus or other bus structure as can be appreciated. The processing circuitry 1000 can include a display screen 103 for rendering of generated graphics such as, e.g., a user interface and/or receive inputs from a user.

The processing circuitry 1000 can also include an input/output interface 1012 through which user input can be received from a user interface unit 1015 such, e.g., a keypad, mouse or touch screen and/or output from the slide processing unit 100 can be sent to an external display for rendering. In addition, the processing circuitry 1000 can include one or more communication interfaces 1018 that allow the processing circuitry 1000 to communicatively couple with other communication devices or networks. The communication interfaces may include one or more wireless connection(s) such as, e.g., Bluetooth®, WiFi (e.g., 802.11) or other radio frequency (RF) connection and/or one or more wired connection(s). The processing circuitry 1000 can also include one or more control interface(s) 1021 in communication with motors (e.g., stepper or servo motors 321 and 330), solenoids, or other controllable devices used to control operation of the slide processing unit 100.

Stored in the memory 1006 are both data and several components that are executable by the processor 1003. In particular, stored in the memory 1006 and executable by the processor 1003 are IPU (image processing unit) system application(s) 1024, an operating system 1027, and/or other applications 1030. IPU system applications 1024 can include applications that support, e.g., control of the operation of the slide (or image) processing unit 100. For example, the IPU system applications 1024 can be configured to automatically process and acquire images of a sample on a slide 306 and provide capabilities for locally and remotely controlling the operation of the slide processing unit 100 as has been described. The IPU system application(s) 1024 can also control calibration of lenses of the imaging device. It is understood that there may be other applications that are stored in the memory 1006 and are executable by the processor 1003 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, LabVIEW® or other programming languages. A data store 1033 and other data such as image data captured by the image capture unit 212 can also be stored in the memory 1006.

A number of software components are stored in the memory 1006 and are executable by the processor 1003. In this respect, the term "executable" means a program file that is in a form that can ultimately be run by the processor 1003. Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 1003 and the memory 1006 may represent multiple memories 1006 that operate in parallel processing circuits, respectively. In such a case, the local interface 1009 may be an appropriate network that facilitates communication between any two of the multiple processors 1003, between any processor 1003 and any of the memories 1006, or between any two of the memories 1006, etc. The local interface 1009 may comprise additional systems designed to coordinate this communication, including, for example, performing load balancing. The processor 1003 may be of electrical or of some other available construction.

Although the IPU system application(s) 1024, the operating system 1027, application(s) 1030, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flow chart of FIG. 9A shows the architecture, functionality, and operation of a possible implementation of an IPU system application 1024 for calibration of one or more lenses of the imaging device. In this regard, each block can represent a module, segment, or portion of code, which comprises one or more executable instructions for implementing the specified logical function(s). It should also be noted that in some alternative implementations, the functions noted in the blocks may occur out of the order noted in FIG. 9A. For example, two blocks shown in succession in FIG. 9A may in fact be executed substantially concurrently or the blocks may sometimes be executed in the reverse order, depending upon the functionality involved, as will be further clarified hereinbelow.

Also, any logic or application described herein, including the IPU system application(s) 1024 and/or application(s) 1030, that comprises software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:
1. A system for processing microscope slides, comprising:
a light source;
an imaging device comprising a lens; and a slide positioner configured to obtain a slide comprising a ground-glass portion and position the ground-glass portion of the slide between the light source and the lens; and processing circuitry configured to:
- position the lens at an initial position distal from the slide;
- acquire an image of at least a section of the ground-glass portion of the slide illuminated by the light source;
- analyze contrast of adjacent pixels of the acquired image with respect to a defined contrast characteristic;
- iteratively advance the lens and acquire additional images from the initial position towards the slide, where the iterative advancement of the lens is based upon analysis of contrast of adjacent pixels of the additional images with respect to the defined contrast characteristic; and
- identify an optimal focal location of the lens based upon the defined contrast characteristic, where subsequent image acquisition via the lens is based at least in part upon the optimal focal location.

2. The system of claim 1, wherein the defined contrast characteristic is a contrast threshold.

3. The system of claim 2, wherein the optimal focal location corresponds to a location where the contrast of the adjacent pixels satisfies the contrast threshold.

4. The system of claim 1, wherein the optimal focal location is identified by a maximum contrast of the adjacent pixels in the acquired images.

5. The system of claim 4, wherein the lens is advanced and another image acquired after the contrast of the adjacent pixels corresponding to the maximum contrast is determined, wherein contrast of the adjacent pixels of the other image is less than the maximum contrast.

6. The system of claim 1, wherein the lens is iteratively advanced by a defined distance.

7. The system of claim 1, wherein advancement of the lens is limited by a lens surface limit defined to prevent contact with a surface of the slide.

8. The system of claim 1, wherein the optimal focal location is stored in non-volatile memory of the processing circuitry.

9. The system of claim 1, wherein the processing circuitry is configured to identify an optimal focal location for a second lens of the imaging device based upon analysis of iteratively acquired images of the ground-glass portion obtained via the second lens.

10. The system of claim 9, wherein the optimal focal location for the second lens is identified based upon contrast of adjacent pixels in the iteratively acquired images.

11. The system of claim 1, wherein the slide comprises a sample on a surface of the slide.

12. The system of claim 1, wherein the imaging device is configured to capture digital images of the sample via the lens based upon the optimal focal location.

13. The system of claim 12, wherein adjustment of the lens towards the slide is limited based upon the optimal focal location.

14. A method for processing microscope slides, comprising:
- positioning a ground-glass portion of a slide between a light source and a lens,
- acquiring images of at least a section the ground-glass portion illuminated by the light source, the images acquired as the lens is advanced through a series of locations beginning at an initial location distal from the slide and stepped towards the ground-glass portion of the slide;
- analyzing contrast of adjacent pixels of the acquired images to identify an optimal focal location of the lens based upon a defined contrast characteristic, where each acquired image is analyzed before advancing the lens to a next location and the lens is advanced in response to the analysis; and
- identifying the optimal focal location of the lens based upon the defined contrast characteristic.

15. The method of claim 14, wherein the defined contrast characteristic is a contrast threshold.

16. The method of claim 14, wherein the optimal focal location is identified by a maximum contrast of the adjacent pixels in the acquired images.

17. The method of claim 14, comprising storing the optimal focal location in memory for subsequent access.

18. The method of claim 14, wherein the slide comprises a sample on a surface of the slide.

19. The method of claim 18, comprising capturing digital images of the sample via the lens based upon the stored optimal focal location.

20. The method of claim 18, wherein the slide positioner positions the ground-glass portion of the slide between the light source and the lens prior to treatment of the sample.

* * * * *